US012122474B2

(12) United States Patent
Ozaki et al.

(10) Patent No.: US 12,122,474 B2
(45) Date of Patent: Oct. 22, 2024

(54) CONTROL DEVICE OF A RIDEABLE MOBILE BODY INCLUDING SPEED LIMITING UNIT FOR LIMITING TARGET SPEED OF THE RIDEABLE MOBILE BODY ACCORDING TO POSITIONAL RELATIONSHIP WITH VIRTUAL WALL

(71) Applicant: HONDA MOTOR CO., LTD., Tokyo (JP)

(72) Inventors: Kazumasa Ozaki, Saitama (JP); Masaki Goto, Saitama (JP); Tomokazu Sakamoto, Saitama (JP); Takeshi Echizenya, Saitama (JP); Makoto Hasegawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 956 days.

(21) Appl. No.: 16/968,244

(22) PCT Filed: Feb. 19, 2019

(86) PCT No.: PCT/JP2019/006139
§ 371 (c)(1),
(2) Date: Aug. 7, 2020

(87) PCT Pub. No.: WO2019/167729
PCT Pub. Date: Sep. 6, 2019

(65) Prior Publication Data
US 2021/0031855 A1    Feb. 4, 2021

(30) Foreign Application Priority Data
Feb. 27, 2018   (JP) .................................. 2018-032881

(51) Int. Cl.
*B62K 11/00* (2006.01)
*B62J 45/20* (2020.01)
*B62K 17/00* (2006.01)

(52) U.S. Cl.
CPC ............... *B62J 45/20* (2020.02); *B62K 17/00* (2013.01)

(58) Field of Classification Search
CPC ................................ B62K 17/00; B62J 45/20
See application file for complete search history.

(56) References Cited

U.S. PATENT DOCUMENTS

2009/0140886 A1   6/2009  Bender
2012/0150367 A1*  6/2012  Potagnik .............. G05D 1/0202
                                                              701/3

(Continued)

FOREIGN PATENT DOCUMENTS

JP   2003-228421      8/2003
JP   2010-58604 A     3/2010

(Continued)

OTHER PUBLICATIONS

International Search Report, Date of mailing: May 14, 2019 (May 14, 2019), 2 pages.

(Continued)

*Primary Examiner* — Jess Whittington
(74) *Attorney, Agent, or Firm* — Rankin, Hill & Clark LLP

(57) ABSTRACT

A control device 20 of a rideable mobile body 1 determines a target speed of the rideable mobile body 1 according to at least the steering operation by a rider, and controls the travel of the rideable mobile body 1 according to the target speed. In the processing for determining a target speed, the target speed is restricted according to the positional relationship between a virtual wall set in a travel environment of the (Continued)

rideable mobile body 1 and the rideable mobile body 1. Thus, the comfort of the rider is secured while the travel of the rideable mobile body is restricted by the virtual wall.

7 Claims, 10 Drawing Sheets

(56) References Cited

U.S. PATENT DOCUMENTS

| | | | | |
|---|---|---|---|---|
| 2015/0197225 | A1* | 7/2015 | Raste | B60W 10/06 |
| | | | | 701/72 |
| 2019/0346562 | A1* | 11/2019 | Peng | B64U 10/14 |
| 2020/0160151 | A1* | 5/2020 | Urtasun | G06N 20/00 |

FOREIGN PATENT DOCUMENTS

| | | |
|---|---|---|
| JP | 2011-065609 | 3/2011 |
| JP | 2013-237324 | 11/2013 |
| JP | 2016-210386 | 12/2016 |

OTHER PUBLICATIONS

Development of Risk Reducing Algorithm for Personal Mobility Robots and its Practicality Evaluation at TSUKUBA Special District for Mobility Robots, Takashi Kodachi et al., Journal of the Robotics Society of Japan, vol. 32 No. 7, pp. 651-662, 2014, English abstract included, 12 pages.

Chinese Office Action dated May 8, 2021, 9 pages.

\* cited by examiner

CONTROL DEVICE OF A RIDEABLE MOBILE BODY INCLUDING SPEED LIMITING UNIT FOR LIMITING TARGET SPEED OF THE RIDEABLE MOBILE BODY ACCORDING TO POSITIONAL RELATIONSHIP WITH VIRTUAL WALL

TECHNICAL FIELD

The present invention relates to a control device of a rideable mobile body.

BACKGROUND ART

As a small rideable mobile body that can travel with ease in various places by the steering operation performed by a rider riding thereon, there has been known a rideable mobile body disclosed in, for example, Patent Literature 1. The rideable mobile body disclosed in Patent Literature 1 is an inverted-pendulum vehicle, which travels while maintaining the balance of the center of gravity of the entire vehicle including a rider by the rider moving his or her upper body or manipulating an operating unit of the vehicle.

Further, for example, Patent Literature 2 describes a technique for moving a mobile robot (cleaning robot) such that the mobile robot avoids a boundary signal output from a boundary signal transmitter.

CITATION LIST

Patent Literatures

Patent Literature 1: Japanese Patent Application Laid-Open No. 2013-237324
Patent Literature 2: Japanese Patent Application Laid-Open No. 2003-228421

SUMMARY OF INVENTION

Technical Problem

When a rideable mobile vehicle like the one disclosed in Patent Literature 1 is used in various facilities and venues, consideration is given to setting up a virtual wall in the travel environment of the rideable mobile vehicle so as to prevent the rideable mobile vehicle from entering or approaching a no-entry place or a place that is not suitable for the travel of the rideable mobile body, thereby limiting the travel of the rideable mobile vehicle by the virtual wall.

Here, as a technique related to this, the technique disclosed in, for example, Patent Literature 2 is known. However, according to the technique disclosed in Patent Literature 2, when a mobile robot detects a boundary signal corresponding to a virtual wall, the mobile robot changes its direction arbitrarily. For this reason, if the technique disclosed in Patent Literature 2 is applied as it is, the travel motion of the rideable mobile body tends to cause the rider to feel uncomfortable.

Solution to Problem

The present invention has been made in view of such a background, and an object of the invention is to provide a control device capable of ensuring the comfort of a rider while limiting the travel of the rideable mobile body by a virtual wall.

To this end, a control device of a rideable mobile body in accordance with the present invention is a control device of a rideable mobile body that can travel with a rider boarded thereon, including:
a target speed determination unit that determines a target speed of the rideable mobile body according to at least a steering operation by the rider; and
a travel control unit which controls the travel of the rideable mobile body according to the target speed,
wherein the target speed determination unit is configured to include a speed limiting unit that carries out processing for limiting the target speed according to a positional relationship between a virtual wall set in a travel environment of the rideable mobile body and the rideable mobile body (a first aspect of the invention).

In the present invention, the target speed of the rideable mobile body means the target value of the travel speed of a representative point of the rideable mobile body. Further, limiting the target speed means to set the magnitude of a component of at least one direction of the target speed to be smaller than the magnitude of the component of a speed of the rideable mobile body required according to the steering operation.

According to the first aspect of the invention, the target speed is limited according to the positional relationship between the virtual wall and the rideable mobile body on the premise that the target speed of the rideable mobile body is determined according to at least the steering operation by the rider. This makes it possible to determine the target speed such that the travel of the rideable mobile body can be limited on the basis of the positional relationship while reflecting an intention of the rider by the steering operation. In addition, the travel of the rideable mobile body is controlled according to the target speed.

Thus, according to the first aspect of the invention, the comfort of a rider can be secured by limiting the travel of a rideable mobile body by a virtual wall.

More specifically, in the first aspect of the invention described above, the speed limiting unit is preferably configured to limit the target speed by processing for correcting the speed of the rideable mobile body required in response to the steering operation according to the positional relationship (a second aspect of the invention).

With this configuration, the travel of the rideable mobile body can be ideally limited according to the positional relationship while reflecting the intention of the rider by the steering operation.

In the first or the second aspect of the invention described above, the speed limiting unit is preferably configured to carry out processing for limiting the target speed on the condition that a distance between the rideable mobile body and the virtual wall is smaller than a predetermined value (a third aspect of the invention).

This configuration makes it possible to properly limit the travel of the rideable mobile body in the vicinity of a virtual wall and to prevent the travel of the rideable mobile body from being limited at a place relatively far from the virtual wall.

In the first to the third aspects of the invention described above, the speed limiting unit is preferably configured to increase the degree of limiting of the target speed as the distance between the rideable mobile body and the virtual wall decreases at the time of carrying out processing for limiting the target speed (a fourth aspect of the invention).

With this configuration, as the rideable mobile body approaches closer to the virtual wall, the degree of limiting of the target speed is increased, thus making it possible to properly prevent the rideable mobile body from coming in contact with or excessively approaching the virtual wall.

In the first to the fourth aspects of the invention described above, the speed limiting unit is preferably configured to change the degree of limiting of the target speed according to the direction of the rideable mobile body with respect to the virtual wall at the time of carrying out the processing for limiting the target speed (a fifth aspect of the invention).

With this configuration, the degree of limiting of the target speed can be changed according to the direction, thus making it possible to prevent the limiting degree from becoming insufficient in a situation in which the rideable mobile body is likely to approach the virtual wall or to prevent the limiting degree from becoming excessive in a situation in which the rideable mobile body is unlikely to approach the virtual wall. Hence, it is possible to prevent the limiting degree from becoming insufficient or excessive.

In the first to the fifth aspects of the invention described above, the speed limiting unit is preferably configured to control the magnitude of a rate of temporal change of the degree of limiting of the target speed to a predetermined upper limit value or less at the time of carrying out the processing for limiting the target speed (a sixth aspect of the invention).

With this configuration, the rate of temporal change (the amount of change per unit time) of the limiting degree of the target speed can be prevented from becoming excessive. Thus, the actual speed change of the rideable mobile body can be prevented from becoming excessive in a situation in which the target speed is limited. As a result, it is possible to prevent the comfort of the rider from being impaired.

In the first to the sixth aspects of the invention described above, in the case where the target speed determination unit is configured to determine a set of a target speed in a longitudinal direction of the rideable mobile body and a target speed in a lateral direction thereof, a mode can be adopted in which the speed limiting unit is configured to be capable of setting a first index value indicating a speed limiting degree related to the speed of the rideable mobile body in a forward direction, a second index value indicating a speed limiting degree related to the speed of the rideable mobile body in a rightward direction, and a third index value indicating a speed limiting degree related to the speed of the rideable mobile body in a leftward direction according to the positional relationship, and to limit the target speed of the rideable mobile body in the forward direction according to the first index value and to limit the target speed of the rideable mobile body in the lateral direction according to the second index value or the third index value at the time of carrying out the processing for limiting the target speed (a seventh aspect of the invention).

This configuration makes it possible to easily limit a target speed in a mode suited to the travel direction of the rideable mobile body corresponding to the target speed, the distance between the rideable mobile body and the virtual wall, and the direction of the rideable mobile body with respect to the virtual wall.

DESCRIPTION OF EMBODIMENTS

Figure 1:
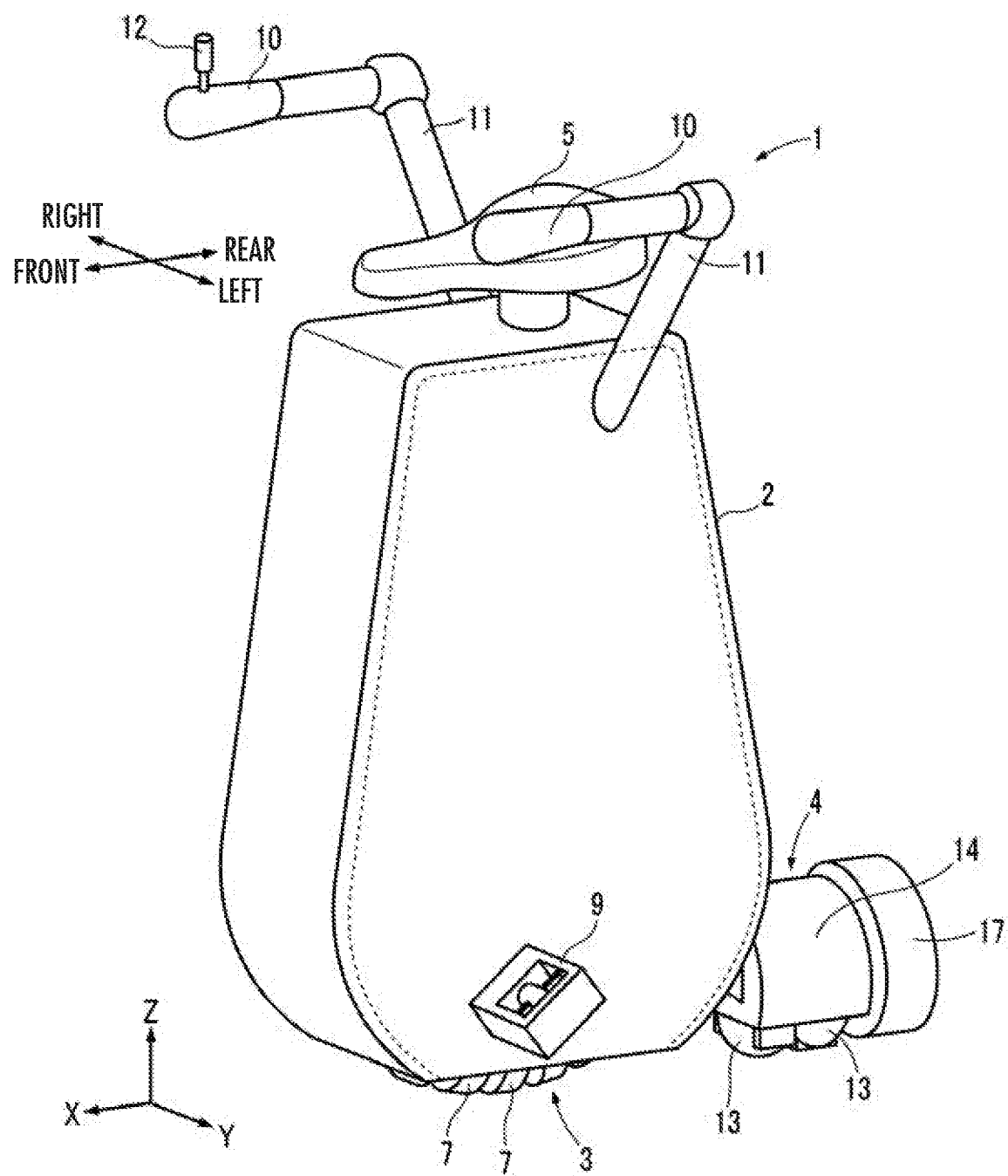
FIG. 1 is a perspective view of an inverted-pendulum vehicle as a rideable mobile body according to an embodiment of the present invention.
Figure 2:
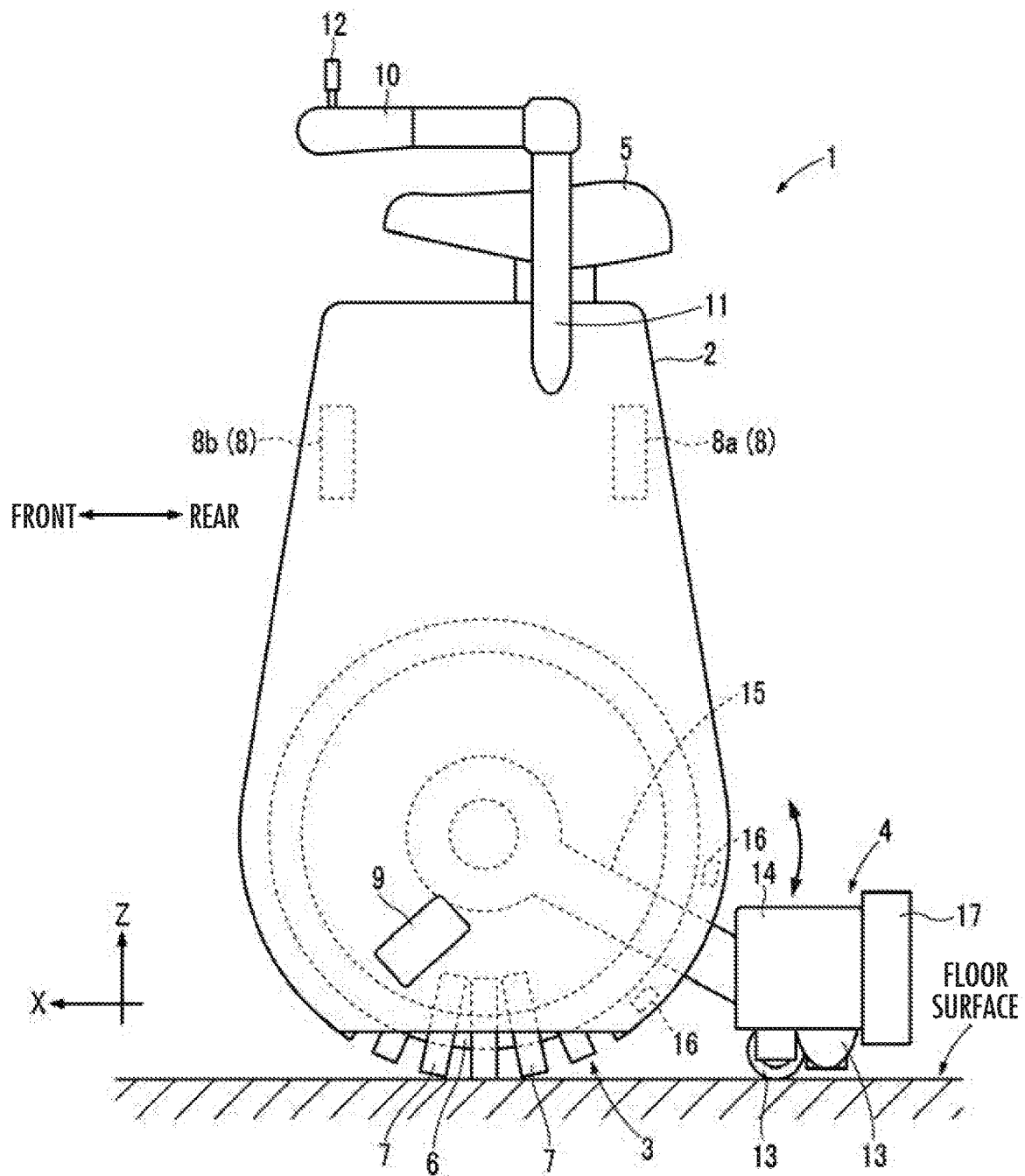
FIG. 2 is a side view of the inverted-pendulum vehicle according to the embodiment.

An embodiment of the present invention will be described below with reference to the accompanying drawings FIG. 1 to FIG. 12. As illustrated in FIG. 1 and FIG. 2, a rideable mobile body 1 according to the present embodiment is, for example, an inverted-pendulum vehicle, and includes a base body 2, a first traveling motion unit 3 and a second traveling motion unit 4 that can travel on a floor surface, and a rider boarding unit 5 for a rider to sit on. Hereinafter, in the description of the present embodiment, the rideable mobile body 1 will be simply referred to as the vehicle 1. The "floor surface" is not limited to the floor surface in a usual sense, but may be a ground surface, a road surface, or the like.

The first traveling motion unit 3 includes a circular ring-shaped core 6 (hereinafter referred to as the circular core 6) illustrated in FIG. 2 and a plurality of circular ring-shaped rollers 7 attached to the circular core 6 at equal angle intervals in the circumferential direction (around the axial center) of the circular core 6. Each of the rollers 7 is externally inserted into the circular core 6 with its rotation axis center oriented in the circumferential direction of the circular core 6. Further, each of the rollers 7 is adapted to be rotatable integrally with the circular core 6 around the axial center of the circular core 6, and also to be rotatable around the center axis of the cross section of the circular core 6 (the circumferential axis around the axial center of the annular core 6).

As illustrated in, for example, FIG. 1 and FIG. 2, the first traveling motion unit 3 having the circular core 6 and the plurality of rollers 7 can be brought into contact with a floor surface through the intermediary of the rollers 7 (the rollers 7 positioned at the bottom of the circular core 6) with the axial center of the circular core 6 oriented parallel (or substantially parallel) to the floor surface. In this state of contact with the floor surface, rotationally driving the circular core 6 around its axis center rotates the entire circular core 6 and the rollers 7. This enables the first traveling motion unit 3 to travel on the floor surface in a direction orthogonal to the axial center of the circular core 6 (more specifically, in a direction orthogonal to the direction in which the axial center of the circular core 6 is projected onto the floor surface). Further, in the foregoing state of contact with the floor surface, rotationally driving the rollers 7 in its rotation axis center enables the first traveling motion unit 3 to travel in the direction of the axial center of the circular core 6 (more specifically, in the direction in which the axial center of the circular core 6 is projected onto the floor surface).

Further, rotationally driving the circular core 6 and rotationally driving the rollers 7 enable the first traveling motion unit 3 to travel in a direction inclined with respect to the direction orthogonal to the axial center of the circular core 6 and the direction of the axial center of the circular core 6.

Thus, the first traveling motion unit 3 can travel in all directions on the floor surface. In the following description, of the traveling directions of the first traveling motion unit 3 (traveling directions projected and viewed on a horizontal plane), the direction orthogonal to the axial center of the circular core 6 is defined as an X-axis direction, and the direction of the axial center of the circular core 6 is defined as a Y-axis direction, and a vertical direction is defined as a Z-axis direction, as illustrated in FIG. 1 and FIG. 2. In other words, the X-axis direction corresponds to the longitudinal direction of the vehicle 1, and the Y-axis direction corresponds to the lateral direction of the vehicle 1. The forward direction of the vehicle 1 is defined as the positive direction of the X axis, the left direction is defined as the positive direction of the Y axis, and the upward direction is defined as the positive direction of the Z axis.

The base body 2 has the foregoing first traveling motion unit 3 attached thereto. The base body 2 is provided, covering the first traveling motion unit 3 except a lower portion of the first traveling motion unit 3 that comes in contact with the floor surface. Further, the circular core 6 of the first traveling motion unit 3 is supported on the base body 2 such that the circular core 6 is rotatable around the axial center thereof. In this case, the base body 2 is tiltable in the direction around its axial center (around the Y axis) with the axial center of the circular core 6 of the first traveling motion unit 3 being the supporting point. In addition, when the base body 2 is tilted together with the first traveling motion unit 3 with respect to the floor surface, the base body 2 can be tilted around the X axis, which is orthogonal to the axial center of the circular core 6, with a ground contact portion of the first traveling motion unit 3 being the supporting point. The base body 2 is, therefore, tiltable around the two axes with respect to the vertical direction.

Further, as illustrated in FIG. 2, a first actuator device 8, which generates a driving force for the first traveling motion unit 3 to travel, is installed inside the base body 2. The first actuator device 8 is composed of an electric motor 8a serving as an actuator that rotationally drives the circular core 6 and an electric motor 8b serving as an actuator that rotationally drives the rollers 7. Further, the electric motors 8a and 8b impart rotational driving forces to the circular core 6 and the rollers 7 through power transmission mechanisms (not illustrated). The power transmission mechanisms may have publicly known structures.

The first traveling motion unit 3 may have a structure that is different from the structure described above. For example, the structures of the first traveling motion unit 3 and the driving system thereof may be the structures proposed by the applicant in PCT International Publication WO/2008/132778 or PCT International Publication WO/2008/132779.

Further, the rider boarding unit 5 is attached to the base body 2. The rider boarding unit 5 is composed of a seat on which a rider sits and is fixed to the upper end of the base body 2. Further, the rider can sit on the rider boarding unit 5 with the longitudinal direction thereof being the X-axis direction and the lateral direction thereof being the Y-axis direction. In addition, the rider boarding unit 5 (seat) is fixed to the base body 2, so that the rider boarding unit 5 is tiltable integrally with the base body 2 with respect to the vertical direction.

Further attached to the base body 2 are a pair of foot rests 9, 9 on which the rider seated on the rider boarding unit 5 places his or her feet, and a pair of handles 10, 10 to be held by the rider. The foot rests 9, 9 are protrusively provided at the lower portions of both side surfaces of the base body 2. In FIG. 1 and FIG. 2, the foot rest 9 on one side (the right side) is not illustrated.

The handles 10, 10 are bar-shaped handles disposed, extending in the X-axis direction (the longitudinal direction) on both sides of the rider boarding unit 5, and are fixed to the base body 2 through rods 11 extending from the base body 2. Further, one handle 10 (the right handle 10 in the drawing) of the handles 10, 10 is provided with a joystick 12 serving as an operating unit.

The joystick 12 can be swung in the longitudinal direction (around the Y axis) and the lateral direction (around the X axis). Further, in the present embodiment, the joystick 12 outputs an operation signal indicating the amount of swing in the longitudinal direction (around the Y axis) as a command for moving the vehicle 1 forward or backward and also outputs an operation signal indicating the amount of swing in the lateral direction (around the X axis) as a command (turn command) for turning the vehicle 1 rightward (clockwise) or leftward (counterclockwise).

The second traveling motion unit 4 in the present embodiment is composed of a so-called Omni Wheel (registered trademark). The Omni Wheel (registered trademark) as the second traveling motion unit 4 has a publicly known structure that includes a pair of coaxial circular cores (not illustrated) and a plurality of barrel-shaped rollers 13 that are rotatably and externally inserted in the circular cores, with the rotation axes thereof oriented in the circumferential direction of the circular cores.

In this case, the second traveling motion unit 4 is placed behind the first traveling motion unit 3, with the axial centers of the pair of circular cores oriented in the X-axis direction (the longitudinal direction), and comes in contact with the floor surface through the intermediary of the rollers 13.

One roller 13 and the other roller 13 of the foregoing pair of circular cores are placed with the phases thereof shifted in the circumferential direction. Therefore, when the pair of circular cores rotates, either the one roller 13 or the other roller 13 of the pair of circular cores comes in contact with the floor surface.

The second traveling motion unit 4 composed of the Omni Wheel is connected to the base body 2. More specifically, the second traveling motion unit 4 has a chassis 14 that covers the upper portion of the Omni Wheel (all of the pair of circular cores and the plurality of rollers 13). The pair of circular cores of the Omni Wheel is pivotably supported on the chassis 14 such that the pair of circular cores is rotatable around the axial centers thereof. Further, an arm 15 extended from the chassis 14 toward the base body 2 is pivotably supported on the base body 2 such that the arm 15 can swing around the axial center of the circular core 6 of the first traveling motion unit 3. Thus, the second traveling motion unit 4 is connected to the base body 2 through the intermediary of the arm 15.

Further, the second traveling motion unit 4 can swing around the axial center of the circular core 6 of the first traveling motion unit 3 with respect to the base body 2 by the swing of the arm 15. This enables the rider boarding unit 5 to be tilted around the Y axis together with the base body 2 while both the first traveling motion unit 3 and the second traveling motion unit 4 are kept in contact with the floor surface.

Alternatively, the arm 15 may be pivotably supported on the axial center portion of the circular core 6 of the first traveling motion unit 3, and the second traveling motion unit 4 may be connected to the first traveling motion unit 3 through the intermediary of the arm 15.

Further, the base body 2 is provided with a pair of stoppers 16, 16 that restricts the swing range of the arm 15. This allows the arm 15 to swing within the range defined by the stoppers 16, 16. With this arrangement, the swing range of the second traveling motion unit 4 around the axial center of the circular core 6 of the first traveling motion unit 3 and the tilt range of the base body 2 and the rider boarding unit 5 around the Y axis are restricted. This prevents the base body 2 and the rider boarding unit 5 from excessively tilting backward relative to the rider. The second traveling motion unit 4 may be urged by a spring or the like so as to be pressed against the floor surface.

As described above, by rotating one or both of the pair of circular cores and the rollers 13, the second traveling motion unit 4 can travel on the floor surface in all directions including the X-axis direction and the Y-axis direction, as with the first traveling motion unit 3. More specifically, the second traveling motion unit 4 can travel in the Y-axis direction (the lateral direction) by the rotation of the circular cores, and the second traveling motion unit 4 can travel in the X-axis direction (the longitudinal direction) by the rotation of the rollers 13.

Further, an electric motor 17 serving as the second actuator that drives the second traveling motion unit 4 is installed to the chassis 14 of the second traveling motion unit 4. The electric motor 17 is connected to the pair of circular cores of the second traveling motion unit 4 so as to rotationally drive the pair of circular cores.

Thus, according to the present embodiment, the second traveling motion unit 4 travels in the X-axis direction in a driven manner, following the travel of the first traveling motion unit 3 in the X-axis direction. Further, the second traveling motion unit 4 travels in the Y-axis direction by rotationally driving the pair of circular cores of the second traveling motion unit 4 by the electric motor 17.

The above has described the mechanical configuration of the vehicle 1 in the present embodiment. The second traveling motion unit 4 may have the same structure as that of the first traveling motion unit 3. Further, the vehicle 1 of the present embodiment is a mobile body provided with the second traveling motion unit 4; however, the vehicle 1 may be a mobile body without the second traveling motion unit 4. In this case, a second actuator device (the electric motor 17) and a second control processing unit 22, which will be discussed later, are not required.

Figure 3:
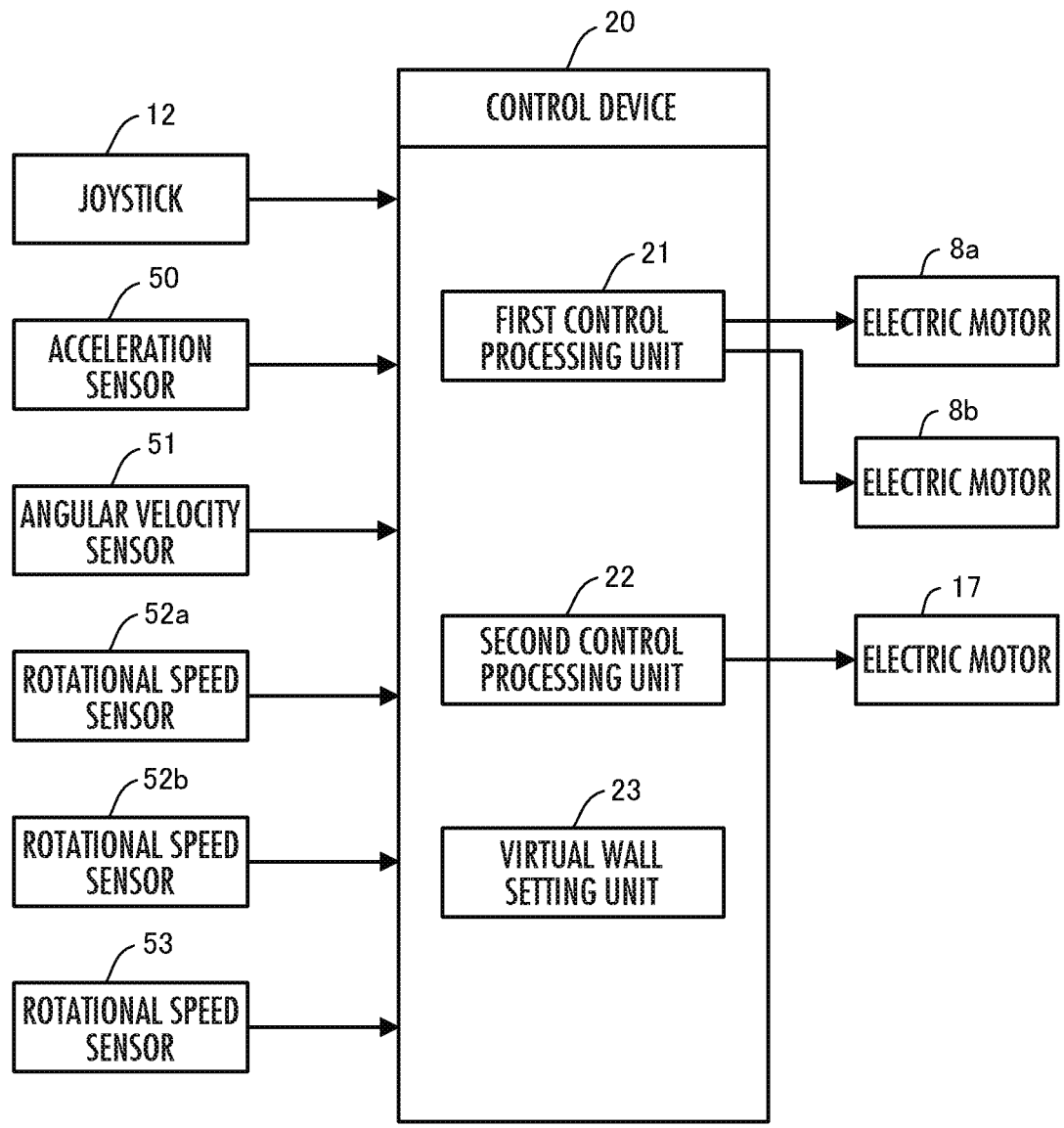
FIG. 3 is a block diagram illustrating a configuration related to the control of the inverted-pendulum vehicle according to the embodiment.

Although not illustrated in FIG. 1 and FIG. 2, the base body 2 of the vehicle 1 of the present embodiment is provided with a control device 20, an acceleration sensor 50 that detects the acceleration of the base body 2 in the directions of the three axes, an angular velocity sensor 51 that detects the angular velocities around the three axes, a rotational speed sensor 52a that detects the rotational speed of the electric motor 8a, a rotational speed sensor 52b that detects the rotational speed of the electric motor 8b, and a rotational speed sensor 53 that detects the rotational speed of the electric motor 17 as the components for controlling the operation of the vehicle 1 (for controlling the operations of the first traveling motion unit 3 and the second traveling motion unit 4), as illustrated in FIG. 3. The angular velocity sensor 51 is composed of, for example, a gyro sensor or the like, and the rotational speed sensors 52a, 52b and 53 are composed of, for example, rotary encoders, resolvers, or the like.

The control device 20 is composed of one or more electric circuit units that includes microcomputers, processors, memories, interface circuits and the like. The control device 20 receives the outputs (operation signals) of the joystick 12, and the detection signals of the acceleration sensor 50, the angular velocity sensor 51 and the rotational speed sensors 52a, 52b and 53.

Further, the control device 20 has, as one function implemented by one or both of an installed hardware configuration and a program (software configuration), a function for acquiring the measurement value of the translational acceleration (the translational acceleration in the X-axis direction and the Y-axis direction) of the base body 2, the measurement value of the angular velocity (the angular velocity in a yaw direction (around the Z-axis direction)) of the base body 2, and the measurement value of the tilt angle (the tilt angle of the base body 2) of the rider boarding unit 5 on the basis of the detection signals of the acceleration sensor 50 and the angular velocity sensor 51 as inertial sensors by using a publicly known method, such as a strapdown method.

The tilt angle of the rider boarding unit 5 (or the tilt angle of the base body 2) in the present embodiment is, more specifically, the tilt angle (indicated by a set of a tilt angle around the X axis and a tilt angle around the Y axis) provided that the attitude of the rider boarding unit 5 (or the base body 2) in a state in which the overall center of gravity of the vehicle 1 (the overall center of gravity including a rider when the rider is on the rider boarding unit 5) is positioned directly above (vertically above) or substantially directly above a ground contact portion of the first traveling motion unit 3 is defined as the reference (zero).

The control device 20 has, as functions in addition to the foregoing functions, a first control processing unit 21 that controls the traveling motion of the first traveling motion unit 3 by controlling the electric motors 8a, 8b constituting the first actuator device 8, a second control processing unit 22 that controls the traveling motion of the second traveling motion unit 4 by controlling the electric motor 17 serving as the second actuator device, and a virtual wall setting unit 23 that sets a virtual wall in the travel environment of the vehicle 1. In the present embodiment, the travel control unit in the present invention is composed of the first control processing unit 21 and the second control processing unit 22.

The first control processing unit 21 carries out the arithmetic processing, which will be discussed later, to sequentially calculate a target speed that is a target value of the traveling speed (more specifically, a set of a translational speed in the X-axis direction and a translational speed in the Y-axis direction) of the first traveling motion unit 3, and controls the rotational speeds of the electric motors 8a, 8b such that the actual traveling speed of the first traveling motion unit 3 coincides with the target speed.

In this case, the relationship between the rotational speeds of the electric motors 8a, 8b and the actual traveling speed of the first traveling motion unit 3 (more specifically, the traveling speed when there is no slippage between the first traveling motion unit 3 and the floor surface) is established beforehand according to the configuration of a power transmission mechanism between the electric motors 8a, 8b and the first traveling motion unit 3. The target values of the rotational speeds of the electric motors 8a, 8b are specified according to the target speed of the first traveling motion unit 3.

Then, the first control processing unit 21 carries out feedback control on the rotational speeds of the electric motors 8a, 8b to the target values specified according to the target speed of the first traveling motion unit 3 so as to control the actual traveling speed of the first traveling motion unit 3 to coincide with the target speed.

Further, the second control processing unit 22 carries out the arithmetic processing, which will be discussed later, to sequentially calculate a target speed that is a target value of the traveling speed (more specifically, the translational speed in the Y-axis direction) of the second traveling motion unit 4, and controls the rotational speed of the electric motor 17 such that the actual traveling speed of the second traveling motion unit 4 in the Y-axis direction coincides with the target speed.

In this case, as with the case of the first traveling motion unit 3, the relationship between the rotational speed of the electric motor 17 and the actual traveling speed of the second traveling motion unit 4 in the Y-axis direction (more specifically, the traveling speed when there is no slippage between the second traveling motion unit 4 and the floor surface) is established beforehand, and the target value of the rotational speed of the electric motor 17 is specified according to the target speed of the second traveling motion unit 4.

Then, the second control processing unit 22 carries out feedback control on the rotational speed of the electric motor 17 to the target value specified according to the target speed of the second traveling motion unit 4 so as to control the actual traveling speed of the second traveling motion unit 4 in the Y-axis direction to coincide with the target speed.

Supplementally, in the present embodiment, the second traveling motion unit 4 travels in the X-axis direction in a driven manner, following the travel of the first traveling motion unit 3 in the X-axis direction. Hence, there is no need to set the target value of the traveling speed of the second traveling motion unit 4 in the X-axis direction.

Further, the virtual wall setting unit 23 sets a virtual wall corresponding to the boundary of the movable area of the vehicle 1 around the vehicle 1 when the vehicle 1 starts traveling after the power is turned on (e.g., when the parking stand, which is not illustrated, is released). In this case, the virtual wall setting unit 23 sets the virtual wall at a position having a predetermined positional relationship with respect to a reference position (e.g., a position at a predetermined distance from the reference position), using, for example, the position of the vehicle 1 at the start of travel as the reference position.

The setting mode of the virtual wall is not limited to the foregoing mode. For example, the virtual wall setting unit 23 may set the virtual wall on the basis of the map information of the travel environment of the vehicle 1, or obstacle information (the information of the positions of obstacles around the vehicle 1) acquired from an external sensor such as a camera mounted on the vehicle 1 or an external server. In addition, the virtual wall may be set by an external server or the like, and the control device 20 may acquire (download) the set virtual wall as appropriate.

A further detailed description will now be given of the processing by the first control processing unit 21 and the second control processing unit 22 described above. First, the processing by the first control processing unit 21 will be described with reference to FIG. 4 to FIG. 11.

Figure 4:
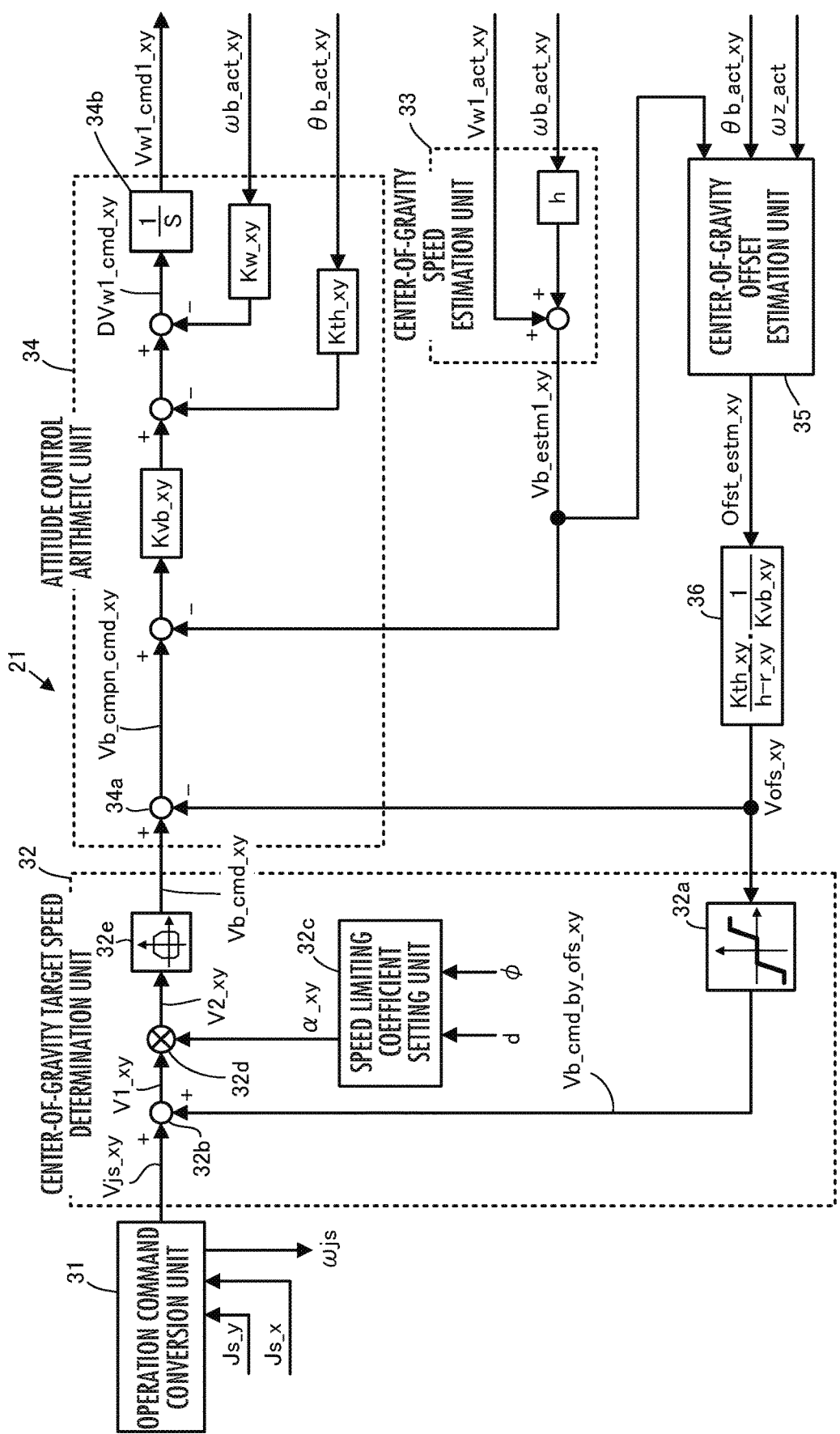
FIG. 4 is a block diagram illustrating the processing by an essential section of a first control processing unit illustrated in FIG. 3.

As illustrated in FIG. 4, the first control processing unit 21 has, as the main functional units thereof, an operation command conversion unit 31 that converts a set of a swing amount of the joystick 12 in the longitudinal direction (the amount of rotation around the Y axis) Js_x and a swing amount thereof in the lateral direction (the amount of rotation around the X axis) Js_y, which is indicated by an operation signal received from the joystick 12, into a speed command for the vehicle 1 to travel, a center-of-gravity target speed determination unit 32 that determines a target speed Vb_cmd_xy of the overall center of gravity of the vehicle 1 (hereinafter referred to as the overall center of gravity of the vehicle system), a center-of-gravity speed estimation unit 33 that estimates the actual speed Vb of the overall center of gravity of the vehicle system, an attitude control arithmetic unit 34 that determines the target speed Vw1_cmd_xy of the first traveling motion unit 3 so as to stabilize the attitude of the rider boarding unit 5 (the attitude of the base body 2) while making a speed Vb of the overall center of gravity of the vehicle system follow the target speed Vb_cmd_xy, a center-of-gravity offset estimation unit 35 that estimates the center-of-gravity offset amount Ofst_xy of the overall center of gravity of the vehicle system, which will be discussed later, and a center-of-gravity offset influence amount calculation unit 36 that calculates a center-of-gravity offset influence amount Vofs_xy attributable to the center-of-gravity offset amount Ofst_xy, which will be described later. The center-of-gravity target speed determination unit 32 corresponds to the target speed determination unit in the present invention.

Then, the first control processing unit 21 sequentially carries out the processing by each of these functional units at a predetermined arithmetic processing cycle to determine the target speed Vw1_cmd_xy of the first traveling motion unit 3. In the description of the present embodiment, stabilizing the attitude of the rider boarding unit 5 (the attitude of the base body 2) means to balance the overall center of gravity of the vehicle system like an inverted pendulum mass point.

Further, in the description of the embodiment of the present specification, a reference numeral with a subscript "_x" means a state quantity or a parameter related to the behavior of the vehicle 1 when the vehicle 1 is viewed from the Y-axis direction (when viewed by projecting on a ZX plane), and a reference numeral with a subscript "_y" means a state quantity or a parameter related to the behavior of the vehicle 1 when the vehicle 1 is viewed from the X-axis direction (when viewed by projecting on a YZ plane).

Further, a reference numeral with a subscript "_xy" means a set of a state quantity or a parameter when the vehicle 1 is viewed from the X-axis direction and a state quantity or a parameter when the vehicle 1 is viewed from the Y-axis direction. For example, a target speed Vw1_cmd_xy of the first traveling motion unit 3 means a set of the target speed Vw1_cmd_x of the first traveling motion unit 3 when the vehicle 1 is viewed from the Y-axis direction (i.e., the target speed in the X-axis direction) and the target speed Vw1_cmd_y of the first traveling motion unit 3 when the vehicle 1 is viewed from the X-axis direction (i.e., the target speed in the Y-axis direction).

Figure 5:
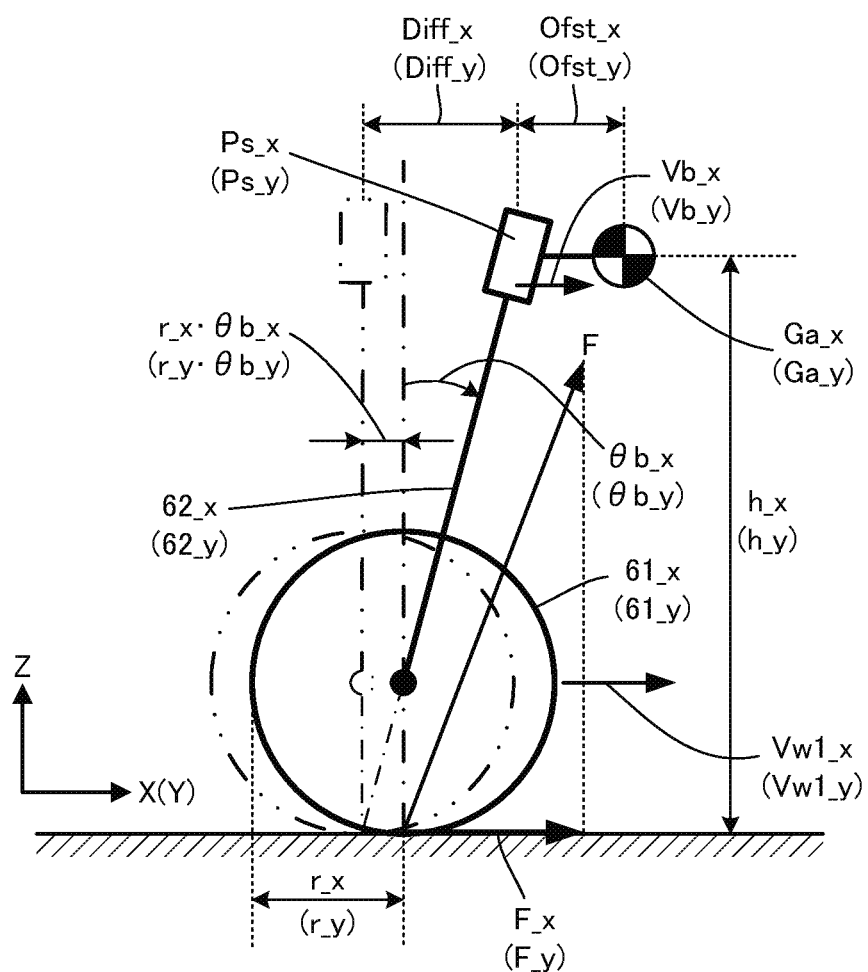
FIG. 5 is a diagram for explaining an inverted-pendulum model used for the processing by the first control processing unit illustrated in FIG. 3.

Here, before specifically describing the processing by each functional unit of the first control processing unit 21, items that provide the basis of the processing will be described. The dynamic behavior of the overall center of gravity of the vehicle system (more specifically, a behavior viewed from the Y-axis direction and a behavior viewed from the X-axis direction) is approximately expressed by the behavior of the inverted-pendulum model as illustrated in FIG. 5. The algorithm of the processing by the first control processing unit 21 is constructed on the basis of this behavior.

In FIG. 5, in order to illustrate both the inverted-pendulum model viewed from the Y-axis direction and the inverted-pendulum model viewed from the X-axis direction, the reference numerals of the variables in the case of the view from the Y-axis direction are not parenthesized, while the reference numerals of the variables in the case of the view from the X-axis direction are parenthesized.

The inverted-pendulum model that represents the behavior of the overall center of gravity of the vehicle system viewed from the Y-axis direction has a virtual wheel 61_x which has a rotation axis parallel to the Y-axis direction and which is rollable on a floor surface (hereinafter referred to as the virtual wheel 61_x), a rod 62_x which extends from the rotation center of the virtual wheel 61_x and which is swingable around the rotation axis of the virtual wheel 61_x (around the Y axis), and a mass point Ga_x connected to a reference portion Ps_x, which is a distal portion (upper end portion) of the rod 62_x.

In the inverted-pendulum model, the motion of the mass point Ga_x corresponds to the motion of the overall center of gravity of the vehicle system viewed from the Y-axis direction, and a tilt angle θb_x (a tilt angle around the Y axis) of the rod 62_x with respect to the vertical direction coincides with the tilt angle around the Y axis of the rider boarding unit 5 (or the base body 2). Further, the translational motion in the X-axis direction of the first traveling motion unit 3 corresponds to the translational motion in the X-axis direction caused by the rolling of the virtual wheel 61_x.

Further, a radius r_x of the virtual wheel 61_x and a height h_x of the reference portion Ps_x and the mass point Ga_x from the floor surface take preset default values (fixed values).

Similarly, the inverted-pendulum model that represents the behavior of the overall center of gravity of the vehicle system viewed from the X-axis direction has a virtual wheel 61_y which has a rotation axis parallel to the X-axis direction and which is rollable on a floor surface (hereinafter referred to as the virtual wheel 61_y), a rod 62_y which extends from the rotation center of the virtual wheel 61_y and which is swingable around the rotation axis of the virtual wheel 61_y (around the X axis), and a mass point Ga_y connected to a reference portion Ps_y, which is a distal portion (upper end portion) of the rod 62_y.

In the inverted-pendulum model, the motion of the mass point Ga_y corresponds to the motion of the overall center of gravity of the vehicle system viewed from the X-axis direction, and a tilt angle θb_y (a tilt angle around the X axis) of the rod 62_y with respect to the vertical direction coincides with the tilt angle around the X axis of the rider boarding unit 5 (or the base body 2). Further, the translational motion in the Y-axis direction of the first traveling motion unit 3 corresponds to the translational motion in the Y-axis direction caused by the rolling of the virtual wheel 61_y.

Further, a radius r_y of the virtual wheel 61_y and a height h_y of the reference portion Ps_y and the mass point Ga_y from the floor surface take preset default values (fixed values). The height h_y of the reference portion Ps_y and the mass point Ga_y from the floor surface when viewed in the X-axis direction is the same as the height h_x of the reference portion Ps_x and the mass point Ga_x from the floor surface when viewed in the Y-axis direction. Therefore, hereinafter, h_x=h_y=h.

Here, the positional relationship between the reference portion Ps_x and the mass point Ga_x when viewed from the Y-axis direction will be supplementally described. The position of the reference portion Ps_x corresponds to the position of the overall center of gravity of the vehicle system in the case where it is assumed that the rider riding (seated) on the rider boarding unit 5 remains stationary in a predetermined neutral posture with respect to the rider boarding unit 5.

Hence, in this case, the position of the mass point Ga_x coincides with the position of the reference portion Ps_x. This applies also to the positional relationship between the reference portion Ps_y and the mass point Ga_y when viewed from the X-axis direction.

However, in practice, the actual positions of the overall center of gravity of the vehicle system in the X-axis direction and the Y-axis direction are generally shifted horizontally from the positions of the reference portions Ps_x and Ps_y when the rider on the rider boarding unit 5 moves his or her upper body or the like with respect to rider boarding unit 5 (or the base body 2). For this reason, in FIG. 5, the positions of the mass points Ga_x and Ga_y are illustrated, being shifted from the positions of the reference portions Ps_x and Ps_y, respectively.

The behaviors of the overall center of gravity of the vehicle system represented by the inverted-pendulum model described above are represented by expressions (1a), (1b), (2a) and (2b) given below. Expressions (1a), (1b) indicate a behavior viewed from the Y-axis direction, and expressions (2a), (2b) indicate a behavior viewed from the X-axis direction.

$$Vb\_x = Vw1\_x + h \cdot \omega b\_x \quad (1a)$$

$$dVb\_x/dt = (g/h) \cdot (\theta b\_x \cdot (h - r\_x) + Ofst\_x) + \omega z \cdot Vb\_y \quad (1b)$$

$$Vb\_y = Vw1\_y + h\_y \cdot \omega b\_y \quad (2a)$$

$$dVb\_y/dt = (g/h) \cdot (\theta b\_y \cdot (h - r\_y) + Ofst\_y) + \omega z \cdot Vb\_x \quad (2b)$$

Vb_x denotes the speed of the overall center of gravity of the vehicle system in the X-axis direction (translational speed), θb_x denotes the tilt angle of the rider boarding unit 5 (or the base body 2) around the Y axis, Vw1_x denotes the traveling speed of the virtual wheel 61_x in the X-axis direction (translational speed), ωb_x denotes the temporal change rate of θb_x (=dθb_x/dt), Ofst_x denotes the amount of offset of the position of the overall center of gravity of the vehicle system in the X-axis direction (the position of the mass point Ga_x in the X-axis direction) from the position of the reference portion Ps_x in the X-axis direction, Vb_y denotes the speed of the overall center of gravity of the vehicle system in the Y-axis direction (translational speed), Vw1_y denotes the traveling speed of the virtual wheel 61_y in the Y-axis direction (translational speed), θb_y denotes the tilt angle of the rider boarding unit 5 (or the base body 2) around the X axis, ωb_y denotes the temporal change rate of θb_y (=dθb_y/dt), and Ofst_y denotes the amount of offset of the position of the overall center of gravity of the vehicle system in the Y-axis direction (the position of the mass point Ga_y in the Y-axis direction) from the position of the reference portion Ps_y in the Y-axis direction. Further, ωz denotes the yaw rate when the vehicle 1 turns (the angular velocity around a yaw axis), and g denotes a gravitational acceleration constant.

In expressions (1a), (1b), (2a) and (2b), the positive direction of θb_x and ωb_x is the direction in which the overall center of gravity of the vehicle system tilts in the positive direction of the X axis (forward direction), and the positive direction of θb_y and ωb_y is the direction in which the overall center of gravity of the vehicle system tilts in the positive direction of the Y axis (leftward). Further, the positive direction of ωz is the counterclockwise direction as the vehicle 1 is viewed from above.

Further, the second term (=h·ωb_x) of the right side of expression (1a) denotes a translational speed component of the reference portion Ps_x in the X-axis direction generated by the tilting of the rider boarding unit 5 around the Y axis, and the second term (=h·ωb_y) of the right side of expression (2a) denotes a translational speed component of the reference portion Ps_y in the Y-axis direction generated by the tilting of the rider boarding unit 5 around the X axis.

Further, the first term of the right side of expression (1b) denotes an acceleration component in the X-axis direction generated at the overall center of gravity of the vehicle system by an X-axis direction component F_x (refer to FIG. 5) of a floor reaction force F acting on a ground contact portion of the virtual wheel 61_x according to the amount of offset (=θb_x·(h−r_x)+Ofst_x) of the position of the overall center of gravity of the vehicle system in the X-axis direction (the position of the mass point Ga_x in the X-axis direction) from the vertical upper position of the ground contact portion of the virtual wheel 61_x (the ground contact portion of the first traveling motion unit 3 viewed from the Y-axis direction), and the second term of the right side of expression (1b) denotes an acceleration component in the X-axis direction generated by a centrifugal force acting on the vehicle 1 when turning at a yaw rate of ωz.

Similarly, the first term of the right side of expression (2b) denotes an acceleration component in the Y-axis direction generated at the overall center of gravity of the vehicle system by a Y-axis direction component F_y (refer to FIG. 5) of a floor reaction force F acting on a ground contact portion of the virtual wheel 61_y according to the amount of offset (=θb_y·(h−r_y)+Ofst_y) of the position of the overall center of gravity of the vehicle system in the Y-axis direction (the position of the mass point Ga_y in the Y-axis direction) from the vertical upper position of a ground contact portion of the virtual wheel 61_y (a ground contact portion of the first traveling motion unit 3 viewed from the X-axis direction), and the second term of the right side of expression (2b) denotes an acceleration component in the Y-axis direction generated by the centrifugal force acting on the vehicle 1 when turning at the yaw rate of ωz.

In the present embodiment, as described above, the processing algorithm of the first control processing unit 21 is constructed on the basis of the behavior model (the inverted-pendulum model) of the overall center of gravity of the vehicle system in which the amount of offset of the overall center of gravity of the vehicle system from the reference portions Ps_x and Ps_y and the centrifugal force are taken into consideration.

Based on the above, the processing by the first control processing unit 21 will be described in more detail. Referring to FIG. 4, the first control processing unit 21 first carries out the processing by the operation command conversion unit 31 and the processing by the center-of-gravity speed estimation unit 33 at each arithmetic processing cycle.

Figure 6:
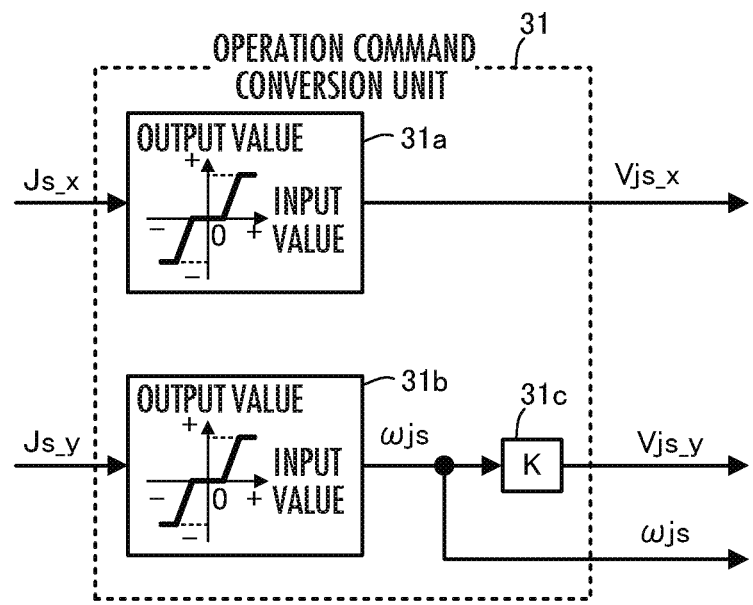
FIG. 6 is a block diagram illustrating the processing by an operation command converting unit illustrated in FIG. 4.

As illustrated in FIG. 6, the operation command conversion unit 31 determines a basic speed command Vjs_xy, which is a basic command value of the traveling speed (translational speed) of the first traveling motion unit 3, and a turning angular velocity command ωjs, which is a command value of the angular velocity around the yaw axis when the vehicle 1 turns, according to the amount of swing of the joystick 12 in the Y-axis direction (the amount of rotation around the X-axis) Js_y and the amount of swing of the joystick 12 in the X-axis direction (the amount of rotation around the Y-axis) Js_x.

In this case, in the basic speed command Vjs_xy, the basic speed command Vjs_x in the X-axis direction is determined by a processing unit 31a according to the amount of swing of the joystick 12 in the X-axis direction Js_x. For example, in the form illustrated by the graph in the processing unit 31a of FIG. 6, the basic speed command Vjs_x is determined by the processing unit 31a such that the direction (polarity) and the size of the basic speed command Vjs_x in the X-axis direction changes according to the direction (polarity) and the size of the amount of swing of the joystick 12 in the X-axis direction Js_x.

Further, the turning angular velocity command ωjs and the basic speed command Vjs_y in the Y-axis direction in the basic speed command Vjs_xy are determined by processing units 31b, 31c according to the amount of swing of the joystick 12 in the Y-axis direction Js_y. For example, in the form illustrated by the graph in the processing unit 31b of FIG. 6, the turning angular velocity command ωjs is determined by the processing unit 31b such that the direction (polarity) and the size of the turning angular velocity command ωjs changes according to the direction (polarity) and the size of the amount of swing of the joystick 12 in the Y-axis direction Js_y.

Further, in the processing unit 31c, the basic speed command of the first traveling motion unit 3 in the Y-axis direction Vjs_y is determined by multiplying the turning angular velocity command ωjs by a predetermined value K (K>0). The predetermined value K is a value set in advance as the distance in the X-axis direction between an instantaneous turning center of the vehicle 1 (an instantaneous center of rotation around the yaw axis at each arithmetic processing cycle when the vehicle 1 turns) and a ground contact point of the first traveling motion unit 3.

If the joystick 12 is operated in both the X-axis direction (longitudinal direction) and the Y-axis direction (lateral direction), then the magnitude of the basic speed command Vjs_y in the Y-axis direction may be changed according to the amount of swing of the joystick 12 in the X-axis direction or the basic speed command in the X-axis direction Vjs_x.

Supplementally, in the present embodiment, the joystick 12 has been illustrated as an example of the operating device for setting the basic speed command Vjs_xy and the turning angular velocity command ωjs. However, the operating device for performing the operation of setting the basic speed command Vjs_xy and the turning angular velocity command ωjs may be an operating device other than the joystick 12. For example, if the control device 20 is configured to be capable of communicating with a mobile terminal such as a smartphone carried by a rider, then the mobile terminal can be used as the operating device for performing the operation of setting the basic speed command Vjs_xy and the turning angular velocity command ωjs.

The center-of-gravity speed estimation unit 33 calculates an estimated value Vb_estm1_xy of the speed Vb of the overall center of gravity of the vehicle system according to kinematic relational expressions indicated by expressions (1a) and (2a) given above.

To be specific, as illustrated in FIG. 4, the estimated value Vb_estm1_xy of the speed Vb of the overall center of gravity of the vehicle system is calculated by adding the value of an actual translational speed Vw1_act_xy of the first traveling motion unit 3 and the value obtained by multiplying the actual temporal change rate (tilt angular velocity) ωb_act_xy of the tilt angle θb_xy of the rider boarding unit 5 by a height h of the overall center of gravity of the vehicle system.

More specifically, an estimated value Vb_estm1_x of the speed Vb_x of the overall center of gravity of the vehicle system in the X-axis direction and an estimated value Vb_estm1_y of the speed Vb_y thereof in the Y-axis direction are calculated by expressions (3a) and (3b) given below.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

In this case, according to the present embodiment, as the values of Vw1_act_x and Vw1_act_y in the foregoing calculation, the target speeds Vw1_cmd_x and Vw1_cmd_y (previous values) of the first traveling motion unit 3 determined by the attitude control arithmetic unit 34 at a previous arithmetic processing cycle are used.

Alternatively, however, for example, the rotational speeds of the electric motors 8a and 8b may be detected by the rotational speed sensors 52a and 52b, respectively, and the latest values of Vw1_act_x and Vw1_act_y estimated from the detected values (in other words, the latest values of the measured values of Vw1_act_x and Vw1_act_y) may be used for the calculation of expressions (3a) and (3b).

Further, in the present embodiment, as the values of ωb_act_x and ωb_act_y, the latest values of the temporal change rates of the measured values of the tilt angles θb_x and θb_y of the rider boarding unit 5 based on the detection signals of the acceleration sensor 50 and the angular velocity sensor 51 (in other words, the latest values of the measured values of ωb_act_x and ωb_act_y) are used.

The first control processing unit 21 carries out the processing by the operation command conversion unit 31 and the center-of-gravity speed estimation unit 33 as described above, and then carries out the processing by the center-of-gravity offset estimation unit 35 illustrated in FIG. 4 so as to determine a center-of-gravity offset amount estimated value Ofst_estm_xy, which is the estimated value of the center-of-gravity offset amount Ofst_xy. In the following description regarding the center-of-gravity offset estimation unit 35, the estimated values Vb_estm1_x and Vb_estm1_y of the speed of the overall center of gravity of the vehicle system calculated by the center-of-gravity speed estimation unit 33 will be referred to as the first estimated values Vb_estm1_x and Vb_estm1_y, respectively.

Figure 7:
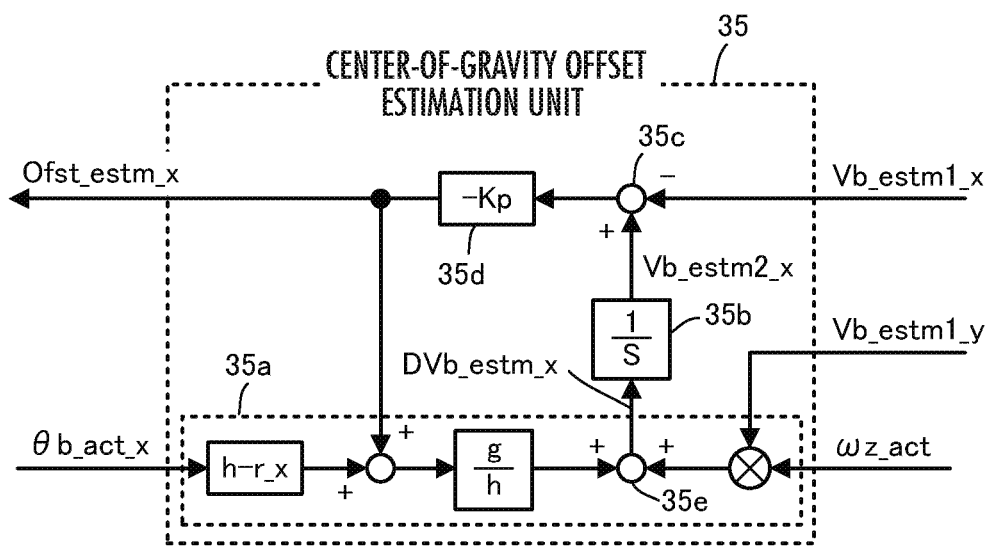
FIG. 7 is a block diagram illustrating the processing by a center-of-gravity offset estimation unit illustrated in FIG. 4.

In the present embodiment, the processing by the center-of-gravity offset estimation unit 35 is carried out, for example, as illustrated by the block diagram of FIG. 7. FIG. 7 representatively illustrates the processing for determining the X-axis direction center-of-gravity offset amount estimated value Ofst_estm_x of the center-of-gravity offset amount estimated value Ofst_estm_xy.

The processing illustrated in FIG. 7 will be specifically described. The center-of-gravity offset estimation unit 35 calculates an estimated value of the translational acceleration of the overall center of gravity of the vehicle system in the X-axis direction DVb_estm_x by carrying out the arithmetic processing of the right side of the foregoing expression (1b) by an arithmetic unit 35a by using the measured value (latest value) of the actual tilt angle θb_act of the rider boarding unit 5 around the Y axis and the measured value (latest value) of the actual yaw rate ωz_act of the vehicle 1 obtained from the detection signals of the acceleration sensor 50 and the angular velocity sensor 51, the first estimated value of the speed of the overall center of gravity of the vehicle system in the Y-axis direction Vb_estm1_y (latest value) calculated by the center-of-gravity speed estimation unit 33, and the X-axis direction center-of-gravity offset amount estimated value Ofst_estm_x (previous value) determined at a previous arithmetic processing cycle.

Further, the center-of-gravity offset estimation unit 35 carries out the processing for integrating the estimated value of the translational acceleration of the overall center of gravity of the vehicle system in the X-axis direction DVb_estm_x by an arithmetic unit 35b thereby to calculate a second estimated value of the speed of the overall center of gravity of the vehicle system in the X-axis direction Vb_estm2_x.

Then, the center-of-gravity offset estimation unit 35 carries out the processing for calculating the difference between the second estimated value of the speed of the overall center of gravity of the vehicle system in the X-axis direction Vb_estm2_x (latest value) and the first estimated value Vb_estm1_x (latest value) by an arithmetic unit 35c.

Further, the center-of-gravity offset estimation unit 35 carries out the processing for multiplying the difference by a predetermined gain (−Kp) by an arithmetic unit 35d so as to determine the latest value of the X-axis direction center-of-gravity offset amount estimated value Ofst_estm_x.

The processing for determining a Y-axis direction center-of-gravity offset amount estimated value Ofst_estm_y is carried out in the same manner as described above. More specifically, the block diagram illustrating the determination processing is obtained by switching the subscripts "x" and "y" in FIG. 7 and by replacing the sign "+" of the acceleration component (the acceleration component generated by a centrifugal force) on the right side in the drawing, which is one of the inputs supplied to an adder 35e, by "−."

The processing by the center-of-gravity offset estimation unit 35 described above makes it possible to determine by converging the center-of-gravity offset amount estimated value Ofst_estm_xy to an actual value by sequentially updating and determining the Ofst_estm_xy.

The first control processing unit 21 then carries out the processing by the center-of-gravity offset influence amount calculation unit 36 illustrated in FIG. 4 to calculate a center-of-gravity offset influence amount Vofs_xy.

The center-of-gravity offset influence amount Vofs_xy indicates the offset of an actual speed from a target speed of the overall center of gravity of the vehicle system in the case where the feedback control is conducted without considering the offset of the position of the overall center of gravity of the vehicle system from the position of the reference portion Ps_xy in the inverted-pendulum model in the attitude control arithmetic unit 34, which will be discussed later.

The center-of-gravity offset influence amount calculation unit 36 calculates the center-of-gravity offset influence amount Vofs_xy by multiplying each component of a newly determined center-of-gravity offset amount estimated value Ofst_estm_xy by a value expressed by (Kth_xy/(h−r_xy))/Kvb_xy.

Kth_xy denotes a gain value for determining a manipulated variable component that functions to bring the tilt angle of the rider boarding unit 5 close to zero in the processing by the attitude control arithmetic unit 34, which will be discussed later. Further, Kvb_xy denotes a gain value for determining a manipulated variable component that functions to bring the difference between the target speed of the overall center of gravity of the vehicle system Vb_cmd_xy and the first estimated value of the speed of the overall center of gravity of the vehicle system Vb_estm1_xy close to zero in the processing by the attitude control arithmetic unit 34, which will be discussed later.

The first control processing unit 21 then carries out the processing by the center-of-gravity target speed determination unit 32 illustrated in FIG. 5 to determine the target speed of the overall center of gravity of the vehicle system Vb_cmd_xy (hereinafter referred to as the center-of-gravity target speed Vb_cmd_xy) at each arithmetic processing cycle.

In this case, the center-of-gravity target speed determination unit 32 first determines a basic value V1_xy of the center-of-gravity target speed Vb_cmd_xy from the basic speed command Vjs_xy (latest value) determined by the operation command conversion unit 31 and the center-of-gravity offset influence amount Vofs_xy (latest value) determined by the center-of-gravity influence amount calculation unit 36. The basic value V1_xy corresponds to the required value of the speed of the overall center of gravity of the vehicle system based on the operation of the joystick 12 and the center-of-gravity offset amount estimated value Ofst_estm_xy. Hereinafter, the basic value V1_xy will be referred to as the center-of-gravity speed basic required value V1_xy.

To be specific, the center-of-gravity target speed determination unit 32 carries out dead zone processing and limit processing on the center-of-gravity offset influence amount Vofs_xy by a processing unit 32a thereby to determine a center-of-gravity speed addition amount Vb_cmd_by_ofs_xy, which is a component based on the center-of-gravity offset amount estimated value Ofst_estm_xy of the center-of-gravity speed basic required value V1_xy.

More specifically, in the present embodiment, the center-of-gravity target speed determination unit 32 sets a center-of-gravity speed addition amount in the X-axis direction Vb_cmd_by_ofs_x to zero in the case where the magnitude of the center-of-gravity offset influence amount in the X-axis direction Vofs_x takes a value in a dead zone area, which is a predetermined range in the vicinity of zero (a value that is relatively close to zero).

Further, if the magnitude of the center-of-gravity offset influence amount in the X-axis direction Vofs_x takes a value that deviates from the dead zone area, then the center-of-gravity target speed determination unit 32 determines the center-of-gravity speed addition amount in the X-axis direction Vb_cmd_by_ofs_x such that Vb_cmd_by_ofs_x has the same polarity as that of Vofs_x and the magnitude thereof increases as the magnitude of Vofs_x increases. However, the value of the center-of-gravity speed addition amount Vb_cmd_by_ofs_x is limited to the range defined by a predetermined upper limit value (>0) and a predetermined lower limit value (≤0). The processing for determining a center-of-gravity speed addition amount in the Y-axis direction Vb_cmd_by_ofs_y is the same as the above.

Next, the center-of-gravity target speed determination unit 32 carries out, by a processing unit 32b, the processing for adding each component of the center-of-gravity speed addition amount Vb_cmd_by_ofs_xy to each component of the basic speed command Vjs_xy determined by the operation command conversion unit 31, thereby calculating the center-of-gravity speed basic required value V1_xy. In other words, the center-of-gravity speed basic required value V1_xy (a set of V1_x and V1_y) is determined by the processing denoted by V1_x=Vjs_x+Vb_cmd_by_ofs_x and V1_y=Vjs_y+Vb_cmd_by_ofs_y.

Supplementally, in the vehicle 1 (riding type mobile body) of the present embodiment, the operation of the joystick 12 and a change in the center-of-gravity offset amount Ofst_xy associated with the movement of the upper body of the rider (weight shift) correspond to the operation of steering the vehicle 1. Further, the overall center of gravity of the vehicle system has a meaning as a representative point of the vehicle 1, and the speed Vb of the overall center of gravity of the vehicle system corresponds to the speed of the riding type movable body in the present invention. Therefore, the center-of-gravity speed basic required value V1_xy corresponds to the speed of the vehicle 1 (riding type mobile body) required according to a steering operation by the rider.

Further, the center-of-gravity target speed determination unit 32 sets, by a speed limiting coefficient setting unit 32c, a speed limiting coefficient $\alpha$_xy (a set of $\alpha$_x and $\alpha$_y) for adding limitation to the center-of-gravity speed basic required value V1_xy according to a current (at a current arithmetic processing cycle) positional relationship between the virtual wall set by the virtual wall setting unit 23 and the vehicle 1. In the speed limiting coefficient $\alpha$_xy, $\alpha$_x denotes a coefficient by which the center-of-gravity speed basic required value V1_x is multiplied to add limitation to the center-of-gravity speed basic required value in the X-axis direction V1_x, and $\alpha$_y denotes a coefficient by which the center-of-gravity speed basic required value V1_y is multiplied to add limitation to the center-of-gravity speed basic required value in the Y-axis direction V1_y. Further, the speed limiting coefficients $\alpha$_x and $\alpha$_y take values in the range from "0" to "1."

Figure 8:
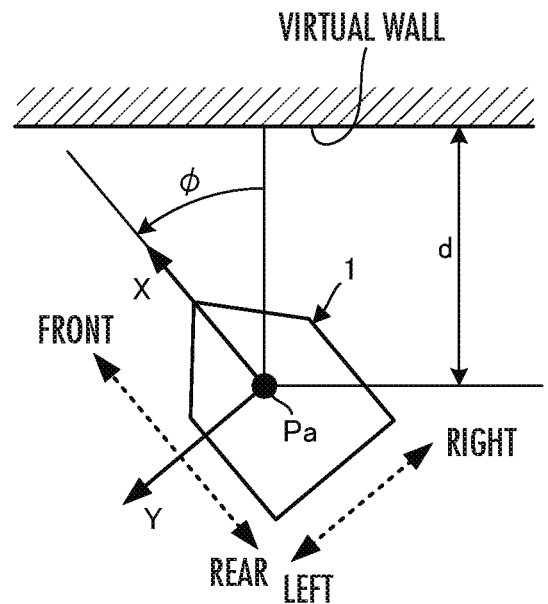
FIG. 8 is an explanatory diagram related to the processing by a speed limiting factor setting unit illustrated in FIG. 4.

The speed limiting coefficient setting unit 32c receives a distance d between the vehicle 1 and the virtual wall and an azimuth $\phi$ denoting the direction of the vehicle 1 with respect to the virtual wall as the information indicating the positional relationship between the virtual wall and the vehicle 1. Referring to FIG. 8, in the present embodiment, the distance d denotes the shortest distance between a representative point Pa of the vehicle 1 (e.g., a ground contact point of the first traveling motion unit 3) and the virtual wall, and the azimuth $\phi$ denotes a tilt angle (tilt angle in the yaw direction) in the longitudinal direction (the X-axis direction) of the vehicle 1 with respect to the direction of the distance d. In FIG. 8, the vehicle 1 is schematically illustrated.

In this case, the azimuth $\phi$ is zero if the longitudinal direction (the X-axis direction) of the vehicle 1 coincides with the direction of the distance d and the virtual wall exists in front of the vehicle 1 (the positive direction of the X axis). Further, the polarity of the azimuth $\phi$ when the front forward direction of the vehicle 1 is inclined in the counterclockwise direction from the direction of the distance d is defined as positive, and the azimuth $\phi$ when the front forward direction of the vehicle 1 is inclined in the clockwise direction from the direction of the distance d is defined as negative. Thus, the azimuth $\phi$ is an angle in the range from $-\pi$[rad] to $+\pi$[rad]. In the example illustrated in FIG. 8, $\phi$>0.

Here, according to the present embodiment, in addition to the functions described above, the control device 20 also has a function for sequentially estimating the position and direction of the vehicle 1 after starting to travel by using, for example, an inertial navigation method or a GNNS (Global Navigation Satellite System). Then, the control device 20 sequentially calculates the above distance d and azimuth angle ϕ on the basis of the estimated position and direction of the vehicle 1 and the information of the placement of the virtual wall set by the virtual wall setting unit 23. The position and direction of the vehicle 1 may be measured by a measuring device outside the vehicle 1.

Figure 9:
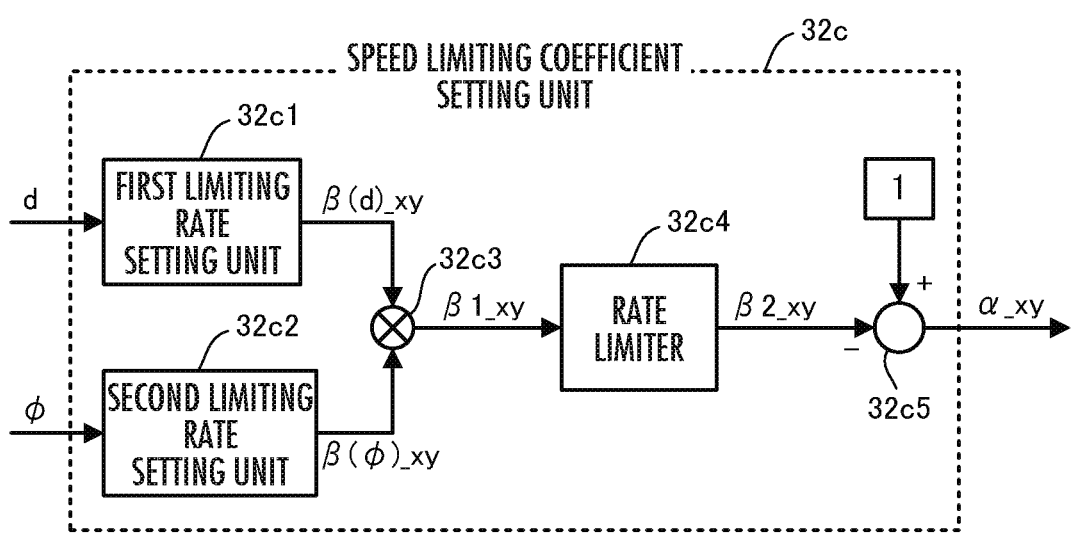
FIG. 9 is a block diagram illustrating the processing by the speed limiting factor setting unit illustrated in FIG. 4.

The speed limiting coefficient setting unit 32c carries out the processing illustrated by the block diagram of FIG. 9 to determine the speed limiting coefficient α_xy from the input distance d and azimuth ϕ. To be specific, the speed limiting coefficient setting unit 32c carries out the processing for setting a first limiting rate β(d)_xy (a set of β(d)_x and β(d)_y) according to the input distance d by a first limiting rate setting unit 32c1, and also carries out the processing for setting a second limiting rate β(ϕ)_xy (a set of β(ϕ)_x and β(ϕ)_y) according to the input azimuth ϕ by a second limiting rate setting unit 32c2.

β(d)_x of the first limiting rate β(d)_xy based on the distance d and β(ϕ)_x of the second limiting rate β(ϕ)_xy are parameters which indicate the required degree of limit of the center-of-gravity target speed Vb_cmd_x with respect to the X-axis direction center-of-gravity speed basic required value V1_x and the values of which are set within the range from "0" to "1" in the present embodiment. Further, each of β(d)_x and β(ϕ)_x indicates that as the value thereof increases (as the value is closer to "1"), the requirement for bringing the X-axis direction center-of-gravity target speed Vb_cmd_x closer to "0" than the center-of-gravity speed basic required value V1_x increases (the requirement for increasing the degree of limiting Vb_cmd_x with respect to V1_x increases).

Similarly, β(d)_y of the first limiting rate β(d)_xy and β(ϕ)_y of the second limiting rate β(ϕ)_xy are parameters which indicate the required degree of limiting of the center-of-gravity target speed Vb_cmd_y with respect to the Y-axis direction center-of-gravity speed basic required value V1_y and the values of which are set within the range from "0" to "1" in the present embodiment. Further, each of β(d)_y and β(ϕ)_y indicates that as the value thereof increases (as the value is closer to "1"), the requirement for bringing the Y-axis direction center-of-gravity target speed Vb_cmd_y closer to "0" than the center-of-gravity speed basic required value V1_y increases (the requirement for increasing the degree of limiting Vb_cmd_y with respect to V1_y increases).

Figure 10:
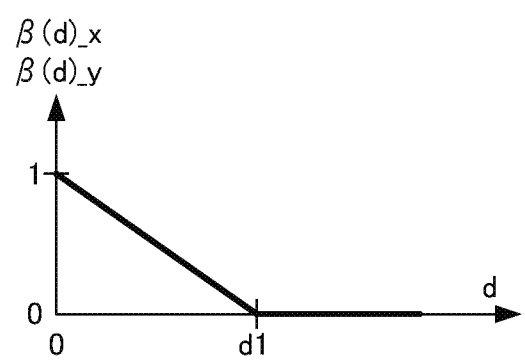
FIG. 10 is a graph for explaining the processing by a first limiting rate setting unit illustrated in FIG. 9.

The first limiting rate setting unit 32c1 sets the components (β(d)_x, β(d)_y) of the foregoing first limiting rate β(d)_xy in a form illustrated in, for example, the graph of FIG. 10, by using a map or an arithmetic expression prepared in advance from the distance d input to the speed limiting coefficient setting unit 32c. More specifically, if the distance d is greater than a predetermined value d1 (if the vehicle 1 is away from the virtual wall), then each component of the first limiting rate β(d)_xy is set to zero. Further, if the distance d is equal to or less than the predetermined value d1 (if the vehicle 1 is close to the virtual wall), then each component of the first limiting rate β(d)_xy is set to monotonically increase from "0" to "1" as the distance d decreases.

In the graph illustrated in FIG. 10, each component of the first limiting rate β(d)_xy linearly changes with respect to a change in the distance d when d≤d1. Alternatively, however, each component of β(d)_xy may be set so as to monotonically change curvilinearly with respect to a change in the distance d when d≤d1. Further, the foregoing predetermined value d1 may be set to be different values for the components of the first limiting rate β(d)_xy, considering the difference in length of the vehicle 1 between the X-axis direction and the Y-axis direction or the difference in behavioral characteristics.

Figure 11A:
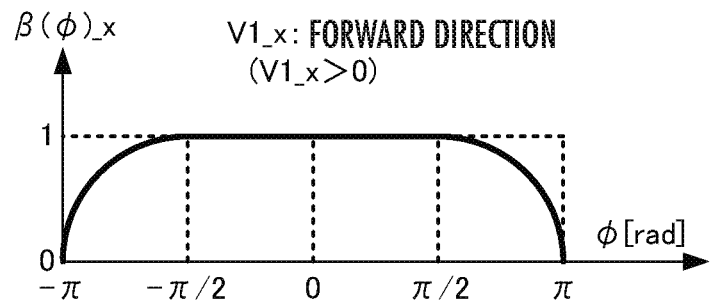
FIG. 11A to FIG. 11C are graphs for explaining the processing by a second limiting rate setting unit illustrated in FIG. 9.

If the X-axis direction component V1_x of the center-of-gravity speed basic required value V1_xy is the speed in the forward direction of the vehicle 1 (if V1_x>0), then the second limiting rate setting unit 32c2 sets β(ϕ)_x of the second limiting rate β(ϕ)_xy from the azimuth ϕ input to the speed limiting coefficient setting unit 32c in the form indicated by, for example, the graph of FIG. 11A according to a map or an arithmetic expression prepared in advance.

More specifically, β(ϕ)_x is set to "1" when the azimuth ϕ takes a value within the range of −π/2[rad]≤ϕ≤π/2[rad]. Therefore, β(ϕ)_x is set to "1" in a situation in which the vehicle 1 is predicted to approach the virtual wall or the possibility of such approach is predicted to be relatively high in the case where it is assumed that vehicle 1 is moved such that the overall center of gravity of the vehicle system is moved toward the front side of vehicle 1 according to the X-axis direction component V1_x (>0) of the center-of-gravity speed basic required value V1_xy.

If the azimuth ϕ takes a value within the range of −π[rad]≤ϕ<−π/2[rad] or a value within the range of π/2[rad] <ϕ≤π[rad], then β(ϕ)_x is set to monotonically decrease from "1" to "0" as the azimuth ϕ approaches −π/[rad] or π/[rad]. Therefore, if it is assumed that the vehicle 1 is moved to cause the overall center of gravity of the vehicle system to move toward the front side of the vehicle 1 according to the X-axis direction component V1_x of the center-of-gravity speed basic required value V1_xy, then the β(ϕ)_x is set to a value that is smaller than "1" in a situation in which the vehicle 1 is predicted to move away from the virtual wall or the possibility of such movement is predicted to be relatively high. In this case, β(ϕ)_x is set to approach "0" as the possibility for the vehicle 1 to move away from the virtual wall increases.

In the present embodiment, if V1_x<0, then the second limiting rate setting unit 32c2 sets β(ϕ)_x to "0" independently of the azimuth ϕ. This is because, according to the present embodiment, the X-axis direction center-of-gravity target speed Vb_cmd_x is limited to a value which is equal to or greater than a predetermined negative value and which is sufficiently small (or a value that is equal to or greater than zero) by the processing carried out by a processing unit 32e, which will be discussed later.

Figure 11B:
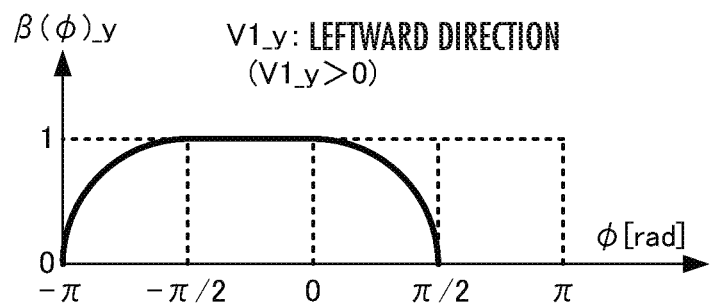
Figure 11C:
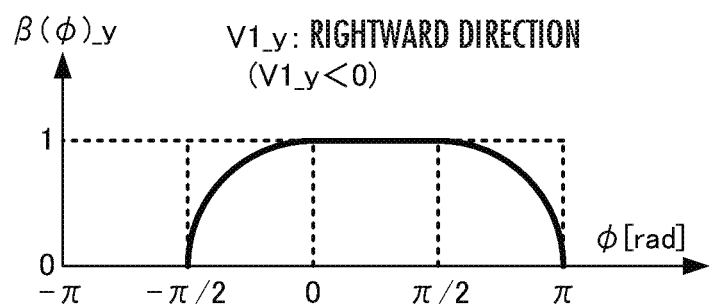

Further, the second limiting rate setting unit 32c2 sets β(ϕ)_y of the second limiting rate β(ϕ)_xy in the form illustrated by, for example, the graph of FIG. 11B or FIG. 11C according to a map or an arithmetic expression prepared in advance from the azimuth ϕ input to the speed limiting coefficient setting unit 32c. More specifically, if the Y-axis direction component V1_y of the center-of-gravity speed basic required value V1_xy is a leftward speed of the vehicle 1 (if V1_y>0), then the second limiting rate setting unit 32c2 sets β(ϕ)_y in the form illustrated by the graph of FIG. 11B according to the azimuth ϕ.

More specifically, β(ϕ)_y is set to "1" when the azimuth ϕ takes a value within the range of −π/2[rad]≤ϕ≤0[rad]. Therefore, β(ϕ)_y is set to "1" in a situation in which the vehicle 1 is predicted to further approach the virtual wall or the possibility of such further approach is predicted to be relatively high in the case where it is assumed that vehicle 1 is moved such that the overall center of gravity of the vehicle system is moved toward the left side of vehicle 1 according to the Y-axis direction component V1_y of the center-of-gravity speed basic required value V1_xy.

If the azimuth φ takes a value within the range of −π[rad]≤φ<−π/2[rad] or a value within the range of 0<φ≤π/2[rad], then β(φ)_y is set to monotonically decrease from "1" to "0" as the azimuth φ approaches −π/[rad] or π/2[rad]. Further, if the azimuth φ takes a value within the range of π/2[rad]<φ≤π[rad], then β(φ)_y is set to "0."

Therefore, if it is assumed that the vehicle 1 is moved to cause the overall center of gravity of the vehicle system to move toward the left side of the vehicle 1 according to the Y-axis direction component V1_y of the center-of-gravity speed basic required value V1_xy, then β(φ)_y is set to a value that is smaller than "1" in a situation in which the vehicle 1 is predicted to move away from the virtual wall or the possibility of such movement is predicted to be relatively high. In this case, β(φ)_y is set to approach "0" or to be maintained at zero as the possibility for the vehicle 1 to move away from the virtual wall increases.

Further, the second limiting rate setting unit 32c2 sets β(φ)_y in the form illustrated by the graph of FIG. 11C according to the azimuth φ if the Y-axis direction component V1_y of the center-of-gravity speed basic required value V1_xy is a rightward speed of the vehicle 1 (V1_y<0).

More specifically, β(φ)_y is set to "1" when the azimuth φ takes a value within the range of 0≤φ≤π/2[rad]. Therefore, β(φ)_y is set to "1" in a situation in which the vehicle 1 is predicted to further approach the virtual wall or the possibility of such further approach is predicted to be relatively high in the case where it is assumed that vehicle 1 is moved such that the overall center of gravity of the vehicle system is moved toward the right side of vehicle 1 according to the Y-axis direction component V1_y (<0) of the center-of-gravity speed basic required value V1_xy.

If the azimuth φ takes a value within the range of −π/2[rad]≤φ<0 or a value within the range of π/2[rad]<φ≤π [rad], then β(φ)_y is set to monotonically decrease from "1" to "0" as the azimuth φ approaches −π/2[rad] or π[rad]. Further, if the azimuth φ takes a value within the range of −π[rad]≤φ<−π/2[rad], then β(φ)_y is set to "0."

Therefore, if it is assumed that the vehicle 1 is moved to cause the overall center of gravity of the vehicle system to move toward the right side of the vehicle 1 according to the Y-axis direction component V1_y (<0) of the center-of-gravity speed basic required value V1_xy, then β(φ)_y is set to a value that is smaller than "1" in a situation in which the vehicle 1 is predicted to move away from the virtual wall or the possibility of such movement is predicted to be relatively high. In this case, β(φ)_y is set to approach "0" or to be maintained at zero as the possibility for the vehicle 1 to move away from the virtual wall increases.

The changing pattern in which the second limiting rates β(φ)_x and β(φ)_y monotonically decrease from "1" to "0" may be different from the patterns illustrated in FIG. 11A to FIG. 11C. The changing patterns may be, for example, linear patterns or sinusoidal patterns.

After determining the first limiting rate β(d)_xy and the second limiting rate β(φ)_xy as described above, the speed limiting coefficient setting unit 32c carries out, by a processing unit 32c3, the processing for multiplying the corresponding components of the first limiting rate β(d)_xy and the second limiting rate β(φ)_xy so as to calculate a compound limiting rate β1_xy (a set of β1_x and β1_y). More specifically, each component of the compound limiting rate β1_xy is calculated by performing the calculation of β1_x=β(d)_x·β(φ)_x and β1_y=β(d)_y·β(φ)_y. The compound limiting rate β1_xy calculated here takes a provisional value and therefore will be hereinafter referred to as the provisional compound limiting rate β1_xy.

Supplementally, β1_x of the provisional compound limiting rate β1_xy corresponds to the first index value in the present invention. Further, β1_y determined using the second limiting rate β(φ)_y set in the case where the Y-axis direction component V1_y of the center-of-gravity speed basic required value V1_xy is a rightward speed of the vehicle 1 (in the case where V1_y<0) corresponds to the second index value in the present invention, and β1_y determined using the second limiting rate β(φ)_y set in the case where the Y-axis direction component V1_y of the center-of-gravity speed basic required value V1_xy is a leftward speed of the vehicle 1 (in the case where V1_y>0) corresponds to the third index value in the present invention.

Next, the speed limiting coefficient setting unit 32c carries out, by a rate limiter 32c4, the limit processing on the provisional compound limiting rate β1_xy to determine a final compound limiting rate β2_xy, which is a compound limiting rate actually used to determine the speed limiting coefficient α_xy. The limit processing carried out by the rate limiter 32c4 is the processing for restricting the temporal change rate (a change amount per unit time) of the final compound limiting rate β2_xy.

In the limit processing, it is determined whether the absolute value of the difference in each component between the provisional compound limiting rate β1_xy calculated at the current (present) arithmetic processing cycle of the first control processing unit 21 and a final compound limiting rate β2_xy_p determined at a previous arithmetic processing cycle Δβ_xy (Δβ_x=β1_x−β2_x_p, Δβ_y=β1_y−β2_y_p) is within the range of a predetermined upper limit value Δβmax_xy or less. The difference Δβ1_xy corresponds to the temporal change rate of the provisional compound limiting rate β1_xy as an index value that indicates the degree of limiting of each component of the center-of-gravity target speed Vb_cmd_xy.

Then, β2_x of the final compound limiting rate β2_xy at the current (present) arithmetic processing cycle is determined as described below, depending on whether the absolute value of Δβ_x of Δβ_xy is within the range of an upper limit value Δβmax_x or less. If the absolute value of Δβ_x is within the range of the upper limit value Δβmax_x or less, then the provisional compound limiting rate β1_x calculated by the processing unit 32c3 is directly determined as the final compound limiting rate β2_x at the current arithmetic processing cycle.

Further, if the absolute value of Δβ_x is greater than the upper limit value Δβmax_x, then the final compound limiting rate β2_x at the current arithmetic processing cycle is limited to a value obtained by adding Δβmax_x or −Δβmax_x to the final compound limiting rate β2_x_p at the previous arithmetic processing cycle. More specifically, if Δβ_x<−Δβmax_x, then the final compound limiting rate β2_x at the current arithmetic processing cycle is determined by the calculation expressed by β2_x=β2_x_p−Δβmax_x. Further, if Δβ_x>Δβmax_x, then the final compound limiting rate β2_x at the current arithmetic processing cycle is determined by the calculation expressed by β2_x=β2_x_p+Δβmax_x.

Further, β2_y of the final compound limiting rate β2_xy at the current (the present) arithmetic processing cycle is determined in the same manner as described above, depending on whether the absolute value of Δβ_y of Δβ_xy is within the range of an upper limit value Δβmax_y or less.

By determining the final compound limiting rate β2_xy as described above, the final compound limiting rate β2_xy is determined to converge to the provisional compound limiting rate β1_xy while suppressing a sudden change.

Next, the speed limiting coefficient setting unit 32c carries out, by a processing unit 32c5, the processing for subtracting each component of the final compound limiting rate β2_xy determined as described above from "1" thereby to determine the speed limiting coefficient α_xy. More specifically, each component of the speed limiting coefficient α_xy is determined by α_x=1−β2_x and α_y=1−β2_y.

Accordingly, α_x of the speed limiting coefficient α_xy is determined such that α_x decreases (approaches "0") as the final compound limiting rate β2_x increases (i.e., as the request for increasing the degree of limiting of the center-of-gravity target speed Vb_cmd_x with respect to the X-axis direction center-of-gravity speed basic required value V1_x is stronger).

Similarly, α_y of the speed limiting coefficient α_xy is determined such that α_y decreases (approaches "0") as the final compound limiting rate β2_y increases (i.e., as the request for increasing the degree of limiting of the center-of-gravity target speed Vb_cmd_y with respect to the Y-axis direction center-of-gravity speed basic required value V1_y is stronger).

Returning to the description of FIG. 4, after determining the center-of-gravity speed basic required value V1_xy and the speed limiting coefficient α_xy as described above, the center-of-gravity target speed determination unit 32 carries out, by a processing unit 32d, the processing for multiplying each component of V1_xy by each component of α_xy thereby to calculate a provisional center-of-gravity target speed V2_xy as the provisional value of the center-of-gravity target speed Vb_cmd_xy. More specifically, each component of the provisional center-of-gravity target speed V2_xy is calculated by V2_x=V1_x·α_x and V2_y=V1_y·α_y.

Next, the center-of-gravity target speed determination unit 32 carries out the limit processing on the provisional center-of-gravity target speed V2_xy by the processing unit 32e thereby to determine the center-of-gravity target speed Vb_cmd_xy. The limit processing performed by the processing unit 32e is the processing for determining the center-of-gravity target speed Vb_cmd_xy (a set of Vb_cmd_x and Vb_cmd_y) such that the rotational speed of each of the electric motors 8a and 8b constituting the actuator device 8 of the first traveling motion unit 3 does not deviate from a predetermined permissible range and that the X-axis direction center-of-gravity target speed Vb_cmd_x is limited to a value that is equal to or greater than a predetermined negative value that is sufficiently small (or a value that is equal to or greater than zero).

In the limit processing, if a set of the provisional center-of-gravity target speeds V2_x and V2_y calculated by the processing unit 32d exists in, for example, a predetermined area on a coordinate system having the value of V2_x on the axis of ordinates and the value of V2_y on the axis of abscissas, then the provisional center-of-gravity target speed V2_xy is directly determined as the center-of-gravity target speed Vb_cmd_xy.

Further, if the set of provisional center-of-gravity target speeds V2_x and V2_y calculated by the processing unit 32d deviates from the predetermined area on the coordinate system, then a provisional center-of-gravity target speed V2_xy limited to a set of values of V2_x and V2_y on the boundary of the predetermined area is determined as the center-of-gravity target speed Vb_cmd_xy.

Supplementally, in the present embodiment, the speed limiting coefficient setting unit 32c and the processing unit 32d implement the speed limiting unit in the present invention.

After carrying out the processing by the center-of-gravity target speed determination unit 32 as described above, the first control processing unit 21 then carries out the processing by the attitude control arithmetic unit 34. The attitude control arithmetic unit 34 determines the target speed Vw1_cmd_xy of the first traveling motion unit 3 by the processing illustrated by the block diagram of FIG. 4 such that the attitudes of the rider boarding unit 5 and the base body 2 are stabilized.

More specifically, the attitude control arithmetic unit 34 first carries out, by an arithmetic unit 34a, the processing for subtracting each component of the center-of-gravity offset influence amount Vofs_xy from each component of the center-of-gravity target speed Vb_cmd_xy, thereby determining a center-of-gravity offset compensated target speed Vb_cmpn_cmd_xy.

Next, the attitude control arithmetic unit 34 calculates an X-axis direction target translational acceleration DVw1_cmd_x and a Y-axis direction target translational acceleration DVw1_cmd_y of a target translational acceleration DVw1_cmd_xy, which denotes the target value of the translational acceleration of a ground contact point of the first traveling motion unit 3, by the calculation of expressions (4a) and (4b), respectively, given below. The arithmetic processing is the processing by the arithmetic unit excluding the arithmetic unit 34a and the integration arithmetic unit 34b, which performs integral calculation, in the attitude control arithmetic unit 34 illustrated in FIG. 4.

$$DVw1\_cmd\_x = Kvb\_x \cdot (Vb\_cmpn\_cmd\_x - Vb\_estm1\_x) - \qquad (4a)$$
$$Kth\_x \cdot \theta b\_act\_x - Kw\_x \cdot \omega b\_act\_x$$

$$DVw1\_cmd\_y = Kvb\_y \cdot (Vb\_cmpn\_cmd\_y - Vb\_estm1\_y) - \qquad (4b)$$
$$Kth\_y \cdot \theta b\_act\_y - Kw\_y \cdot \omega b\_act\_y$$

In expressions (4a) and (4b), Kvb_xy, Kth_xy and Kw_xy denote predetermined gain values set in advance.

Further, the first term of the right side of expression (4a) denotes a feedback manipulated variable component based on the difference between the X-axis direction center-of-gravity offset compensated target speed Vb_cmpn_cmd_x (latest value) of the overall center of gravity of the vehicle system and a first estimated value Vb_estm1_x (latest value) of the speed of the overall center of gravity of the vehicle system, the second term denotes a feedback manipulated variable component based on the measured value (latest value) of an actual tilt angle around the Y-axis θb_act_x of the rider boarding unit 5, and the third term denotes a feedback manipulated variable component based on the measured value (latest value) of the actual tilt angular velocity around the Y-axis ωb_act_x of the rider boarding unit 5. Further, the X-axis direction target translational acceleration DVw1_cmd_x is calculated as a compound manipulated variable of the foregoing feedback manipulated variable components.

Similarly, the first term of the right side of expression (4b) denotes a feedback manipulated variable component based on the difference between the Y-axis direction center-of-gravity offset compensated target speed Vb_cmpn_cmd_y (latest value) of the overall center of gravity of the vehicle system and a first estimated value Vb_estm1_y (latest value)

of the speed of the overall center of gravity of the vehicle system, the second term denotes a feedback manipulated variable component based on the measured value (latest value) of an actual tilt angle around the X-axis θb_act_y of the rider boarding unit 5, and the third term denotes a feedback manipulated variable component based on the measured value (latest value) of the actual tilt angular velocity around the X-axis ωb_act_y of the rider boarding unit 5. Further, the Y-axis direction target translational acceleration DVw1_cmd_y is calculated as a compound manipulated variable of the foregoing feedback manipulated variable components.

The foregoing expressions (4a) and (4b) can be rewritten to the following expressions (4a)' and (4b)', respectively.

$$DVw1\_cmd\_x = Kvb\_x \cdot (Vb\_cmd\_x - Vb\_estm1\_x) - \quad (4a)'$$
$$Kth\_x \cdot (Ofst\_estm\_x/(h - r\_x) + \theta b\_act\_x) - Kw\_x \cdot \omega b\_act\_x$$

$$DVw1\_cmd\_y = Kvb\_y \cdot (Vb\_cmd\_y - Vb\_estm1\_y) - \quad (4b)'$$
$$Kth\_y \cdot (Ofst\_estm\_y/(h - r\_y) + \theta b\_act\_y) - Kw\_y \cdot \omega b\_act\_y$$

In this case, the second terms of the right sides of expressions (4a)' and (4b)' have meanings as the feedback manipulated variable components for setting the actual positions of the overall center of gravity of the vehicle system in the X-axis direction and the Y-axis direction to the position directly above the ground contact portion of the first traveling motion unit 3.

Next, the attitude control arithmetic unit 34 integrates the components of the target translational acceleration DVw1_cmd_xy by the integration arithmetic unit 34b thereby to determine the target speed Vw1_cmd1_xy (latest value) of the first traveling motion unit 3.

The processing by the first control processing unit 21 is carried out as described above at each arithmetic processing cycle. This processing makes it possible to determine the target speed Vw1_cmd1_xy of the first traveling motion unit 3 such that the moving speed (the moving speed in the horizontal direction) of the overall center of gravity of the vehicle system converges to the center-of-gravity target speed Vb_cmd_xy while maintaining stable attitudes of the rider boarding unit 5 and the base body 2 of the vehicle 1.

The first control processing unit 21 controls the electric motors 8a, 8b such that the actual moving speed of the first traveling motion unit 3 follows the target speed Vw1_cmd_xy determined as described above.

Next, the processing by the second control processing unit 22 will be described with reference to FIG. 12. In a situation in which the turning angular velocity command ωjs determined by the operation command conversion unit 31 is zero, the second control processing unit 22 determines the target speed Vw2_cmd_y, which denotes the Y-axis direction target value of the moving speed (translational speed) of the second traveling motion unit 4, to coincide with the Y-axis direction target speed Vw1_cmd_y of the first traveling motion unit 3 so as to cause the vehicle 1 to perform translational travel.

Further, in a situation in which the turning angular velocity command ωjs is not zero, the second control processing unit 22 determines the Y-axis direction target speed Vw2_cmd_y of the second traveling motion unit 4 to be different from the Y-axis direction target speed Vw1_cmd_y of the first traveling motion unit 3 so as to cause the vehicle 1 to turn.

Figure 12:
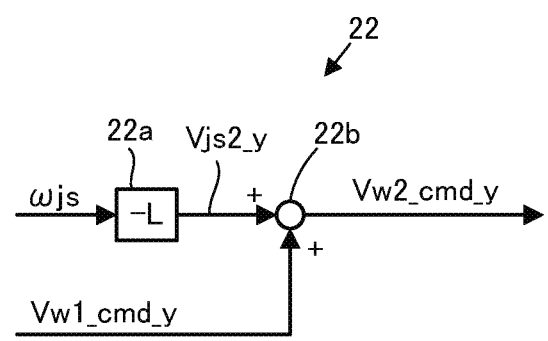
FIG. 12 is a block diagram illustrating the processing by an essential section of a second control processing unit illustrated in FIG. 3.

To be specific, referring to FIG. 12, the second control processing unit 22 first carries out, by an arithmetic unit 22a, the processing for multiplying the above turning angular velocity command ωjs by a value of (−1) times a distance L in the X-axis direction between first traveling motion unit 3 and the second traveling motion unit 4. This determines a relative speed command Vjs2_y, which is the command value of a Y-axis direction relative speed of the second traveling motion unit 4 with respect to the first traveling motion unit 3 to cause the vehicle 1 to turn at an angular velocity of the turning angular velocity command ωjs.

Next, the second control processing unit 22 carries out, by an arithmetic unit 22b, the processing for adding the above relative speed command Vjs2_y (latest value) to the Y-axis direction target speed Vw1_cmd_y (latest value) of the first traveling motion unit 3 determined by the first control processing unit 21. Thus, the Y-axis direction target speed Vw2_cmd_y of the second traveling motion unit 4 is determined.

Then, the second control processing unit 22 controls the electric motor 17 such that the actual moving speed of the second traveling motion unit 4 in the Y-axis direction follows the target speed Vw2_cmd_y determined as described above.

Accordingly to the embodiment described above, basically, the center-of-gravity target speed Vb_cmd_xy is determined as the target speed of a representative point of the vehicle 1 on the basis of the basic speed command Vjs_xy set according the operation of the joystick 12 serving as the operating unit of the vehicle 1 and the center-of-gravity offset influence amount Vofs_xy (or the center-of-gravity offset amount Ofst_xy) caused by the movement of the upper body (weight shift) of a rider. Further, the moving operations of the first traveling motion unit 3 and the second traveling motion unit 4 are controlled so as to achieve the center-of-gravity target speed Vb_cmd_xy. Thus, the rider can steer the vehicle 1 by one or both of the operation of the operating unit (the operation of the joystick 12) and the movement of the upper body (weight shift) of the rider.

In this case, the center-of-gravity target speed Vb_cmd_xy is limited, as appropriate, according to the positional relationship between the virtual wall and the vehicle 1 with respect to the center-of-gravity speed basic required value V1_xy as the speed of the overall center of gravity of the vehicle system (the representative point of the vehicle 1) required according to the steering operation by the rider.

More specifically, if the distance d between the virtual wall and the vehicle 1 is equal to or greater than the foregoing predetermined value d1, then the first limiting rate β(d)_xy is expressed as β(d)_x=β(d)_y=0, so that the provisional compound limiting rate β1_xy is expressed as β1_x=β1_y=0. In this situation, therefore, the center-of-gravity target speed Vb_cmd_xy is not limited by the positional relationship between the virtual wall and the vehicle 1.

Meanwhile, if the distance d between the virtual wall and the vehicle 1 is smaller than the predetermined value d1, then the compound limiting rate (provisional compound limiting rate) β1_xy is set to a value that is greater than zero according to the distance d and the azimuth φ. Hence, the center-of-gravity target speed Vb_cmd_xy is limited with respect to the center-of-gravity speed basic required value V1_xy. Thus, the center-of-gravity target speed Vb_cmd_xy can be sequentially determined such that the vehicle 1 can be properly prevented from excessively approaching the virtual wall while responding to the steering operation by the rider.

The present invention is not limited to the embodiment described above. The following will describe some other embodiments.

In the foregoing embodiment, the center-of-gravity speed basic required value V1_xy, on which the center-of-gravity target speed Vb_cmd_xy is based, is set according to the operation of the operating unit (the operation of the joystick 12) by the rider and the movement of the upper body (weight shift) of the rider. Alternatively, however, the center-of-gravity speed basic required value V1_xy may be set according to either one of the operation of the operating unit (the operation of the joystick 12) by the rider and the movement of the upper body (weight shift) of the rider.

Further, in the foregoing embodiment, the first limiting rate $\beta(d)\_xy$ based on the distance d between the vehicle 1 and the virtual wall and the second limiting rate $\beta(\phi)\_xy$ based on the azimuth $\phi$ of the vehicle 1 with respect to the virtual wall have been separately determined and then combined to determine the compound limiting rate (provisional compound limiting rate) $\beta 1\_xy$. Alternatively, however, for example, each of the compound limiting rates $\beta 1\_x$ and $\beta 1\_y$ (or each of $1-\beta 1\_x$ and $1-\beta 1\_y$) may be directly determined using a map or the like from the distance d and the azimuth $\phi$.

Further, in the foregoing embodiment, each component of the compound limiting rate $\beta 1\_xy$ and each component of the speed limiting coefficient $\alpha\_xy$ have been separately determined. Alternatively, however, for example, the value of the compound limiting rate $\beta 1\_x$ or $\beta 1\_y$ determined as described above, whichever is greater ($=\max(\beta 1\_x, \beta 2\_y)$) may be determined as a common limiting rate for the speeds in the X-axis direction and the Y-axis direction, or the value of the speed limiting coefficient $\alpha\_x$ or $\alpha\_y$ determined as described above, whichever is smaller ($=\min(\alpha\_x, \alpha\_y)$) may be determined as a common speed limiting coefficient for the speeds in the X-axis direction and the Y-axis direction. In this case, the direction of the speed vector defined by the center-of-gravity speed basic required value V1_xy (a set of V1_x and V1_y) and the direction of the speed vector defined by the center-of-gravity target speed Vb_cmd_xy (a set of Vb_cmd_x and Vb_cmd_y) can be matched.

Further, in the foregoing embodiment, the center-of-gravity target speed in the backward direction Vb_cmd_x of the vehicle 1 has been limited by the processing unit 32e, independently of the positional relationship between the vehicle 1 and the virtual wall. Alternatively, however, the center-of-gravity target speed in the backward direction Vb_cmd_x of the vehicle 1 may be limited according to the positional relationship between the vehicle 1 and the virtual wall.

Further, in the foregoing embodiment, the inverted-pendulum vehicle 1 has been illustrated as a rideable mobile body. However, the rideable mobile body in the present invention is not limited to an inverted-pendulum type mobile body, and may be, for example, an electric wheelchair or an electric cart.

The invention claimed is:

1. A control device for controlling speed of a rideable mobile body that can travel in a condition of a rider riding on the rideable mobile body, comprising:
   a target speed determination unit that determines a target speed of the rideable mobile body according to at least a steering operation by the rider; and
   a travel control unit which controls the travel of the rideable mobile body according to the target speed,
   wherein the target speed determination unit is configured to include a speed limiting unit that carries out processing for limiting the target speed according to a positional relationship between a virtual wall set in a travel environment of the rideable mobile body and the rideable mobile body,
   wherein the speed limiting unit is configured to change a degree of limiting of the target speed according to an azimuth angle of the virtual wall with respect to the rideable mobile body at a time of carrying out the processing for limiting the target speed, and
   wherein the speed limiting unit is configured to change the degree of limiting of the target speed in a forward direction, a right direction, and a left direction, respectively, within a specified range of the azimuth angle of the virtual wall with respect to the rideable mobile body when executing the processing for limiting the target speed.

2. The control device of a rideable mobile body according to claim 1,
   wherein the speed limiting unit is configured to limit the target speed by processing for correcting the speed of the rideable mobile body required in response to the steering operation according to the positional relationship.

3. The control device of a rideable mobile body according to claim 1,
   wherein the speed limiting unit is configured to carry out processing for limiting the target speed on the condition that a distance between the rideable mobile body and the virtual wall is smaller than a predetermined value.

4. The control device of a rideable mobile body according to claim 1,
   wherein the speed limiting unit is configured to increase the degree of limiting of the target speed as the distance between the rideable mobile body and the virtual wall decreases at the time of carrying out processing for limiting the target speed.

5. The control device of a rideable mobile body according to claim 1,
   wherein the speed limiting unit is configured to control the magnitude of a rate of temporal change of the degree of limiting of the target speed to a predetermined upper limit value or less at the time of carrying out the processing for limiting the target speed.

6. The control device of a rideable mobile body according to claim 1,
   wherein the target speed determination unit is configured to determine a set of a target speed in a longitudinal direction of the rideable mobile body and a target speed in a lateral direction thereof,
   the speed limiting unit is configured to be capable of setting a first index value indicating a speed limiting degree related to the speed of the rideable mobile body in a forward direction, a second index value indicating a speed limiting degree related to the speed of the rideable mobile body in a rightward direction, and a third index value indicating a speed limiting degree related to the speed of the rideable mobile body in a leftward direction according to the positional relationship, and to limit the target speed of the rideable mobile body in the forward direction according to the first index value and to limit the target speed of the rideable mobile body in the lateral direction according to the second index value or the third index value at the time of carrying out the processing for limiting the target speed.

7. The control device of a rideable mobile body according to claim 1, wherein the speed limiting unit is configured to increase the degree of limiting of the target speed as the azimuth angle increases a likelihood of the rideable mobile body approaching the virtual wall, and the speed limiting unit is configured to decrease the degree of limiting of the target speed as the azimuth angle decreases a likelihood of the rideable mobile body approaching the virtual wall.

\* \* \* \* \*